United States Patent
Wu et al.

(10) Patent No.: US 7,804,746 B2
(45) Date of Patent: Sep. 28, 2010

(54) LAND/GROOVE TRACK AND PICKUP HEAD MOVEMENT DIRECTION DETECTION

(75) Inventors: Gwo-Huei Wu, Pan-Chiao (TW); Yuh Cheng, Chu-Pei (TW); Chao-Ming Huang, Hsin-Tien (TW); Chih-Yuan Chen, Hsin-Chu (TW); Ching-Ning Chiu, Chu-Pei (TW)

(73) Assignee: MediaTek Inc., Hsin-Chu (TW)

( * ) Notice: Subject to any disclaimer, the term of this patent is extended or adjusted under 35 U.S.C. 154(b) by 1599 days.

(21) Appl. No.: 11/077,668

(22) Filed: Mar. 11, 2005

(65) Prior Publication Data

US 2006/0203631 A1  Sep. 14, 2006

(51) Int. Cl.
*G11B 7/00* (2006.01)

(52) U.S. Cl. .................. 369/44.34; 369/53.28

(58) Field of Classification Search ............ None
See application file for complete search history.

(56) References Cited

U.S. PATENT DOCUMENTS

| | | | |
|---|---|---|---|
| 5,828,634 A | 10/1998 | Ohno et al. | |
| 6,175,540 B1 * | 1/2001 | Kim | 369/44.35 |
| 6,388,963 B1 | 5/2002 | Tanaka | |
| 6,452,883 B2 | 9/2002 | Chan | |
| 6,603,716 B1 | 8/2003 | Tateishi et al. | |
| 6,680,881 B2 | 1/2004 | Chan et al. | |
| 6,847,594 B1 * | 1/2005 | Lee | 369/44.13 |
| 2005/0099899 A1 * | 5/2005 | Lee | 369/44.26 |
| 2005/0099908 A1 * | 5/2005 | Fujita et al. | 369/47.27 |

FOREIGN PATENT DOCUMENTS

| | | |
|---|---|---|
| JP | 2001-202635 | 7/2001 |
| JP | 2004-134007 | 4/2004 |
| WO | 2004/034388 | 4/2004 |

* cited by examiner

*Primary Examiner*—Paul Huber
(74) *Attorney, Agent, or Firm*—Fish & Richardson P.C.

(57) ABSTRACT

A detector is scanned across an optical storage medium having groove tracks and land tracks, each track having a wobble structure, to detect light reflected from the optical storage medium. A wobble signal and a tracking error signal are generated based on an output of the detector, and the wobble signal is sampled according to the tracking error signal. A determination about whether the detector is at the groove track or the land track is made based on the tracking error signal and a comparison of sampled values of the wobble signal.

36 Claims, 17 Drawing Sheets

LAND/GROOVE TRACK AND PICKUP HEAD MOVEMENT DIRECTION DETECTION

BACKGROUND

This description relates to land/groove track type and pickup head movement direction detection.

FIG. 1 shows an example of an optical recording system 10 for recording data to and reading data from an optical disc 12. The recording system 10 includes a pickup head 20 that has a laser diode for generating a laser beam 30 and lens (not shown) for focusing the laser beam 30 onto the disc 12. A disc drive controller 14 controls a spindle motor 16 and a sled motor 18, in which the spindle motor 16 adjusts the rotational speed of the disc 12, and the sled motor 18 moves the pickup head 20 over larger distances along a radial direction across the disc 12. The pickup head 20 includes focusing and tracking actuators (not shown), in which the focusing actuator adjusts the position of the lens in an axial direction of the beam 30 to focus the beam 30 on the tracks of the disc 12, and the tracking actuator moves the lens over smaller distances (e.g., several tracks), allowing fine-tuning of the radial position of the laser beam. The position of the beam 30 relative to the disc 12 in the radial direction is controlled by a combination of the sled motor 18 and the tracking actuator. The controller 14 includes circuitry for encoding signals written to the disc 12, circuitry for decoding signals retrieved from the disc 12, and circuitry for interfacing with a host computer 19.

FIG. 2 shows an example of the optical disc 12 that includes a groove track 22 and a land track 28, in which each track forms a spiral on the disc 12. The spiral has multiple turns. In the description below, the plural noun "tracks" may refer to the groove and land tracks, multiple turns of a groove track, or multiple turns of a land track.

FIG. 3 shows a perspective view of the land tracks 28 and the groove tracks 22. The tracks guide the pickup head 20 during read and write operations. Data is written in the tracks by modifying the reflectances of portions of the tracks. As the pickup head 20 scans the tracks, the laser beam 30 is reflected from the tracks, and the intensity of the reflected laser beam is modulated according to the data written in the tracks. The borders of the tracks have recurring deviations in a radial direction 50, referred to as wobbles. The disc 12 may include one or more additional layers not shown in FIG. 3, such as a recordable layer or a rewriteable layer, a reflective layer, and a protective layer.

In one example, data is stored in the groove tracks, and the wobbles in the borders of a groove track 22 include a sinusoidal deviation that is modulated to contain address information. As the pickup head 20 scans the tracks, the reflected laser beam 30 is also modulated by the track wobble, from which a wobble signal that contains information about the track wobble can be generated. The wobble signal can be demodulated to retrieve the address information, which is used by the system 10 to position the pickup head 20 at particular locations in the groove track.

To write data to or read data at a specified address on the disc 12, the system 10 locks the laser beam 30 onto a specified groove track and searches for the specified address. Locking the laser beam 30 to a particular groove track is made difficult by disc run-out problems caused by misalignment and eccentricity of the disc 12.

Referring to FIG. 4, due to manufacturing tolerances, the tracks on the optical disc 12 may not be concentric to a center 56 of a center hole 58 of the disc 12. Also, due to tolerances in the placement of the disc 12 within the recording system 10, the center 56 of the disc 12 may not be perfectly aligned with an axis of rotation of the disc (which is aligned with a center axis of the spindle motor 16). As a result, when the disc 12 rotates, the beam 30 may not follow the groove track closely, but rather, move from an inner track (e.g., at position $P_1$) to an outer track (e.g., at position $P_2$), and from the outer track back to the inner track. The shaded spots represent different positions on the disc 12 on which the laser beam 30 is projected as the disc rotates one revolution.

Moving the laser beam 30 relative to the tracks involves the control of the sled motor 18 and the tracking actuator. For simplicity of description, only the description for the control of the pickup head is provided, and the description for the control of the tracking actuator is omitted. By saying that the pickup head 20 is at a particular track, we mean that the positions of the pickup head 20 and the lens are controlled so that the center of the laser beam 30 is at the particular track, in which a portion of the laser beam 30 may cover an adjacent track. By saying that the pickup head 20 is locked on a particular track, we mean that the positions of the pickup head 20 and the lens are controlled so that the laser beam 30 is locked on the particular track.

Knowing whether the pickup head 20 is currently at a groove track or a land track, and whether the pickup head 20 is moving from an inner track to an outer track, or from an outer track to an inner track, can assist the optical recording system 10 in locking the pickup head 20 on a particular track using a control feedback loop. A tracking error signal can be derived from output signals of photo detectors that detect the reflected laser beam 30. The tracking error signal can be used to determine whether the pickup head 20 is at the center of a track. In one example, the tracking error signal becomes zero when the pickup head 20 is at the center of a land track 28 or a groove track 22, and has a larger or smaller value when the pickup head 20 deviates from the center of the tracks. The optical recording system 10 cannot determine whether the pickup head 20 is at a land track 28 or a groove track 22 based on the tracking error signal alone.

SUMMARY

In general, in one aspect, the invention features a method that includes receiving an optical storage medium having groove tracks and land tracks, each track having a wobble structure. A detector is scanned across the optical storage medium to detect light reflected from the optical storage medium, and a wobble signal and a tracking error signal are generated based on outputs of the detector. The wobble signal is sampled according to the tracking error signal, and a determination about whether the detector is at the groove track or the land track is made based on the tracking error signal and a comparison of sampled values of the wobble signal.

Implementations of the invention may include one or more of the following features. The method includes determining that the detector is at a groove track at a particular time when the sampled value that is obtained at the particular time is greater than another sampled value obtained at another time. The method includes sampling the wobble signal when the tracking error signal is zero. The method includes comparing sampled integral values of an envelope of the wobble signal integrated over different periods of time in the determination of whether the scanning is at a land track or a groove track. The integrals are computed by integrating the amplitude of the envelope of the wobble signal during a time interval in which a slope of the tracking error signal is positive or during a time interval in which the slope of the tracking error signal is negative. The method includes sampling at least one of an amplitude of the wobble signal, a peak value of the wobble signal, and an envelope of the wobble signal.

The method includes, based on knowledge of whether a first track is a groove track or a land track, predicting whether a second track is a groove track or a land track. The method includes comparing the predicted track type of the second track with a measured track type of the second track, the measured track type being determined based in part on the wobble signal. The method includes performing comparisons of predicted track types and measured track types for a number of tracks, and determining that the last predicted track type is the correct track type as long as the number of comparisons indicating that the predicted track types are different from the measured track types is smaller than a preset value. The method includes performing comparisons of predicted track types and measured track types for a number of tracks, and determining that the measured track type is the correct track type if the number of comparisons indicating that the predicted track types are different from the measured track types is greater than a preset value.

In general, in another aspect, the invention features a method that includes receiving an optical storage medium having groove tracks and land tracks, each track having a wobble structure. A detector is scanned across the recording medium to detect light reflected from the recording medium, and a tracking error signal and a wobble signal are generated based on outputs of the detector. The wobble signal is sampled according to the tracking error signal, and a determination about the moving direction of the detector is made based on the tracking error signal and a comparison of sampled values of the wobble signal.

Implementations of the invention may include one or more of the following features. The comparison of sampled values of the wobble signal includes comparing two sampled values of the wobble obtained at different times. Sampled values of the wobble signal are obtained when the tracking error signal is zero. Comparison of sampled values of the wobble signal includes comparison of integrals of an envelope of the wobble signal that are determined by integrating the envelope of the wobble signal during a time interval in which a slope of the tracking error signal is positive or during a time interval in which the slope of the tracking error signal is negative. The method includes generating a binary signal by comparing the tracking error signal to a threshold value, the binary signal having a high or low value depending on the comparison of the tracking error signal to the threshold value, and determining the moving direction of the detector based on the binary signal and a comparison of sampled values of the wobble signal. The threshold value can be zero. The determination of the moving direction is based on a slope of the tracking error signal.

In general, in another aspect, the invention features a method that includes scanning a beam across an optical storage medium having land tracks and groove tracks, each track having a wobble structure. A wobble signal and an RF signal are generated based on light reflected from the optical storage medium, in which the wobble signal has information about the wobble structure of a track scanned by the beam, and the RF signal has information about data recorded in the track. One of the wobble signal and the RF signal is selected, and a determination about whether the beam is at a groove track or a land track is made based on the selected signal.

Implementations of the invention may include one or more of the following features. Selecting one of the wobble signal and the RF signal includes selecting based on whether the beam is at a data region of the optical storage medium having data or at a blank region of the optical storage medium having no data. The method includes generating a tracking error signal having an amplitude that varies depending on a position of the detector relative to the groove tracks and the land tracks, in which determining whether the beam is at a groove track or a land track includes comparing sampled values of the selected signal that are sampled according to the tracking error signal.

In general, in another aspect, the invention features a method that includes generating a wobble signal, a tracking error signal, and an RF signal based on light detected by a detector that is scanned across an optical storage medium having groove tracks and land tracks, each track having a wobble structure. One of the wobble signal and the RF signal is selected, and a determination about a moving direction of the detector relative to the tracks is made based on the tracking error signal and the selected signal.

Implementations of the invention may include one or more of the following features. The method includes selecting one of the wobble signal and the RF signal based on whether the beam is at a data region of the optical storage medium having data or at a blank region of the optical storage medium having no data. The method includes determining the moving direction of the detector based on a comparison of sampled values of the selected signal that are sampled according to the tracking error signal.

In general, in another aspect, the invention features a method that includes generating a tracking error signal having an amplitude that varies depending on a position of a beam relative to an optical storage medium having a groove track and a land track, in which the tracking error signal is substantially equal to a predetermined value when the beam is positioned substantially at a centerline of one of the tracks. The position of the beam relative to the groove track is controlled using a feedback loop based on the tracking error signal, including holding the value of the tracking error signal when the beam is at the land track, and using a measured value of the tracking error signal when the beam is at the groove track.

In general, in another aspect, the invention features a method that includes generating an RF signal and a tracking error signal based on at least one of reflected and transmitted light that is detected by a detector scanned across an optical storage medium having tracks, in which the reflectivity or the transmissivity of the tracks is different from the areas outside of the tracks. Whether the detector is at a track or at a region between the tracks is determined based on a comparison of sampled values of the RF signal that are sampled according to the tracking error signal.

In general, in another aspect, the invention features a method that includes generating an RF signal and a tracking error signal based on reflected or transmitted light that is detected by a detector scanned across an optical storage medium having tracks, in which the reflectivity or the transmissivity of the tracks is different from the areas outside of the tracks. A moving direction of the detector is determined based on a comparison of sampled values of the RF signal that are sampled according to the tracking error signal.

In general, in another aspect, the invention features a method that includes scanning a light beam across an optical storage medium having tracks, the reflectivity of the tracks being different from the areas outside of the tracks. An RF signal is generated based on light reflected from the storage medium, and a determination about whether the scanning is at a track or at a region between the tracks is made based on a comparison of samples of the RF signal.

In general, in another aspect, the invention features a method that includes scanning a detector across an optical disc having tracks to detect light reflected from the disc, the reflectivity of the tracks being different from the areas outside of the tracks. An RF signal is generated based on an output of the detector, and a determination about whether the detector is moving from an outer track towards an inner track or from an inner track towards an outer track is made based on a comparison of samples of the RF signal.

In general, in another aspect, the invention features a method that includes determining whether scanning is occurring at a groove track or a land track on a recording medium based on a comparison of sampled values of a wobble signal that is derived by scanning recurring deviations of a physical property of the groove track or the land track.

Implementations of the invention may include one or more of the following features. The recording medium includes an optical recording medium, and the scanning includes scanning a light beam across the optical recording medium. The recurring deviations include deviations of a boundary of the track in a direction transverse to the track. The sampled values are obtained when the scanning occurs at a center of either a land track or a groove track. The determination of whether the scanning is occurring at one of the groove track or land track is also based on a slope of a signal that changes slope depending on whether the scanning is moving from a land track to a groove track or from a groove track to a land track. Sampled values of the wobble signal include values of the wobble signal integrated over time.

In general, in another aspect, the invention features a method that includes enabling selecting one of a wobble signal and an RF signal to be used in determining whether scanning is occurring at a groove track or a land track on a recording medium based on a comparison of sampled values of the selected signal, each of the tracks having a physical property having recurring deviations.

Implementations of the invention may include the following feature. The selecting one of a wobble signal and an RF signal includes selecting based on whether the scanning occurs at a data region of a track having data or a blank region of a track not having data.

In general, in another aspect, the invention features a method that includes determining a movement direction of a pickup head relative to a land track and a groove track on a recording medium based on a comparison of sampled values of a wobble signal that is derived by detecting recurring deviations of a physical property of the groove track or the land track.

Implementations of the invention may include the following feature. The recording medium includes a disc, and determining the movement of the pickup head includes determining a component of a movement direction of the pickup head, the component being along a radial direction of the disc In general, in another aspect, the invention features an apparatus that includes a pickup head, a wobble signal generator, a tracking error signal generator, and a land/groove track signal generator. The pickup head scans an optical storage medium having groove tracks and land tracks, and detects recurring deviations in a physical property of the tracks. The wobble signal generator generates a wobble signal that represents the recurring deviations and has an amplitude that varies depending on a position of the pickup head relative to the groove track or the land track. The tracking error signal generator generates a tracking error signal. The wobble signal and the tracking error signal are based on outputs of the pickup head. The land/groove track signal generator generates a land/groove signal that indicates whether the pickup head is scanning a groove track or a land track based on the tracking error signal and a comparison of sampled values of the wobble signal.

Implementations of the invention may include one or more of the following features. The land/groove track signal generator includes a comparator for comparing a current sampled value of the wobble signal with a latched sampled value of the wobble signal that is delayed with respect to the current sampled value to generate a comparison signal. The land/groove track signal generator includes a land/groove signal generator for latching the comparison signal in response to changes in a slope of the tracking error signal and outputting the latched comparison signal as the land/groove signal. The land/groove signal generator includes an integrator for integrating an envelope of the wobble signal during a time interval in which a slope of the tracking error signal is positive or during a time interval in which the slope of the tracking error signal is negative, and the land/groove signal generator generates the land/groove signal based on a comparison of a current output of the integrator with a latched output of the integrator that is delayed with respect to the current output.

In general, in another aspect, the invention features an apparatus that includes a detector, a wobble signal generator, a tracking error generator, and a moving direction signal generator. The detector detects variations in an optical storage medium having groove tracks and land tracks. The wobble signal generator generates a wobble signal that represents recurring deviations of a physical property of the groove track or the land track, in which the wobble signal has an amplitude that varies depending on a position of the detector relative to the groove track or the land track. The tracking error signal generator generates a tracking error signal. The tracking error signal and the wobble signal are based on outputs of the detector. The moving direction signal generator generates a direction signal to indicate a movement direction of the detector relative to the tracks based on the tracking error signal and a comparison of sampled values of the wobble signal.

Implementations of the invention may include one or more of the following features. In one example, the moving direction detector includes a comparator for comparing a current sampled value of the wobble signal with a latched sampled value of the wobble signal that is delayed with respect to the current sampled value; and a direction signal generator for generating the direction signal based on the tracking error signal and an output of the comparator. In another example, the moving direction detector includes an integrator for integrating the wobble signal during a time interval in which a slope of the tracking error signal is positive or during a time interval in which the slope of the tracking error signal is negative, and a direction signal generator for generating the direction signal based on a comparison of a current output of the integrator with a latched output of the integrator that is delayed with respect to the current output.

In general, in another aspect, the invention features an optical disc drive that includes an optical pickup head, a wobble signal generator, a tracking error generator, a detection unit, and track accessing module. The optical pickup head detects variations in an optical disc having a groove track and a land track. The wobble signal generator generates a wobble signal based on an output of the pickup head, in which the wobble signal represents recurring deviations of borders of the groove track or the land track. The tracking error generator generates a tracking error signal based on the output of the pickup head, in which the tracking error signal indicates a position of the pickup head relative to the tracks. The detection unit generates at least one of a land/groove signal and a moving direction signal based on the tracking error signal and a comparison of sampled values of the wobble signal, in which the land/groove signal indicates whether the pickup head is at the groove track or the land track, in which the moving direction signal indicates a movement direction of the pickup head relative to the tracks. The track accessing module positions the pickup head relative to the disc based on at least one of the land/groove track signal and the moving direction signal.

Implementations of the invention may include one or more of the following features. In one example, the detection unit includes a protection unit to prevent the track accessing module from using the land/groove track signal or the moving direction signal in positioning the pickup head when the pickup head crosses the tracks at a speed lower than a preset value. In another example, the detection unit includes a protection unit to prevent the track accessing module from using the land/groove track signal or the moving direction signal in positioning the pickup head when a difference of the sampled values of the wobble signal is lower than a preset value.

In general, in another aspect, the invention features an optical disc drive that includes an optical pickup head, a wobble signal generator, an RF signal generator, a tracking error generator, a selection unit, a detection unit, and a track accessing module. The optical pickup head scans an optical disc having a groove track and a land track, in which the pickup head has at least two photo sensors. The wobble signal generator generates a wobble signal, and the RF signal generator generates an RF signal. The tracking error generator generates a tracking error signal indicating a position of the optical pickup head relative to the tracks, and the selection unit selects one of the wobble signal and the RF signal based on whether the pickup head is scanning a data region of the disc having data or a blank region of the disc without data. The detection unit generates at least one of a land/groove track signal and a moving direction signal based on a tracking error signal and a comparison of sampled values of the selected signal, in which the land/groove signal indicates whether the pickup head is scanning the groove track or the land track, in which the moving direction signal indicates a movement direction of the pickup head relative to the tracks. The track accessing module positions the pickup head relative to the disc based on the land/groove track signal or the pickup head moving direction signal.

Implementations of the invention may include one or more of the following features. In one example, the detection unit includes a protection unit for preventing the track accessing module from using the land/groove track signal or the moving direction signal in positioning the pickup head when the track-crossing speed is lower than a preset speed. In another example, the detection unit includes a protection unit for preventing the track accessing module from using the land/groove track signal or the moving direction signal in positioning the pickup head when a difference between sampled values of the selected signal is lower than a preset value. In another example, the detection unit includes a protection unit for preventing the track accessing module from using the land/groove track signal or the moving direction signal in positioning the pickup head for a preset time interval after the pickup head switches from scanning a data region to a blank region or from a blank region to a data region.

In general, in another aspect, the invention features an apparatus that includes a comparator to compare sampled values of a wobble signal that is derived by scanning recurring deviations of a physical property of a groove track or a land track on a recording medium, and a circuit to generate an output indicating whether scanning is occurring at the groove track or the land track based on an output of the comparator.

Implementations of the invention may include the following feature. The apparatus includes an optical pickup head that scans a light beam across the recording medium and detects light reflected from or transmitted through the recording medium to detect the recurring deviations.

In general, in another aspect, the invention features an apparatus that includes a multiplexer to select one of a wobble signal and an RF signal, in which the wobble signal has information about a difference between two signals derived by scanning a groove track or a land track on a recording medium, each track having a physical property having recurring deviations, and the RF signal has information about data recorded in the tracks. The apparatus includes a circuit to generate an output indicating whether scanning is occurring at the groove track or the land track based on a comparison of sampled values of the selected signal.

Implementations of the invention may include the following feature. The multiplexer receives a signal indicating whether the scanning occurs at a data region of a track having data or a blank region of a track not having data.

In general, in another aspect, the invention features an apparatus that includes a comparator to compare sampled values of a wobble signal that is derived by scanning recurring deviations of a physical property of a groove track or a land track on a recording medium, and a circuit to generate an output indicating a movement direction of a pickup head relative to the land track and the groove track based on an output of the comparator.

In general, in another aspect, the invention features an optical disc drive that includes means for scanning an optical disc having a groove track and a land track, each of the tracks having a physical property having recurring deviations, and means for generating a track type signal indicating whether the scanning is occurring at the groove track or the land track based on a comparison of sampled values of a wobble signal having information about the recurring deviations.

In general, in another aspect, the invention features an optical disc drive that includes an optical pickup head to scan an optical disc having a groove track and a land track, each track having a physical property having recurring deviations, and means for generating a pickup movement direction signal indicating a movement direction of the pickup head based on a comparison of sampled values of a wobble signal having information about the recurring deviations.

In general, in another aspect, the invention features an optical disc drive that includes means for generating a wobble signal and an RF signal based on scanning an optical disc having a groove track and a land track, each track having a physical property having recurring deviations, and means for selecting one of the wobble signal and the RF signal. The optical disc drive includes means for determining at least one of (a) whether the scanning is occurring at the groove track or the land track and (b) whether the scanning is moving from an inner track of the disc towards an outer track or from an outer track to an inner track, based on a comparison of sampled values of the selected signal.

The apparatuses and optical disc drives described above may include a decoder that decodes encoded data using a process that is compatible with at least one of CD-R, DVD+R, DVD-R, DVD+RW, DVD-RW, Blu-ray Disc, and High-Density DVD standard.

Other features and advantages of the invention will be apparent from the description and drawings, and from the claims.

DESCRIPTION

An optical recording system can determine whether a pickup head is at a groove track or a land track of an optical disc by sampling a wobble signal when an optical pickup head is near the centers of tracks (represented by the tracking error signal being zero), and comparing the amplitudes of the sampled wobble signals. The wobble signal is a signal that contains information about recurring deviations in the track borders. A particular track is determined to be a groove track if the amplitude of the wobble signal sampled at the particular track is larger than the amplitude of the wobble signal at an adjacent track, and the adjacent track is determined to be a land track. The optical recording system can determine whether the pickup head is moving relative to the tracks from an outer track to an inner track (a track that is closer to a center of the disc), or from an inner track to an outer track (a track that is farther away from the center of the disc) by combining information about the tracking error signal measured over time and information about whether the pickup head is at a groove track or a land track. This allows the recording system to quickly seek and stably lock on to a particular track using a control feedback loop even when the tracks are not entirely concentric to a rotation axis of the disc.

Figure 5:
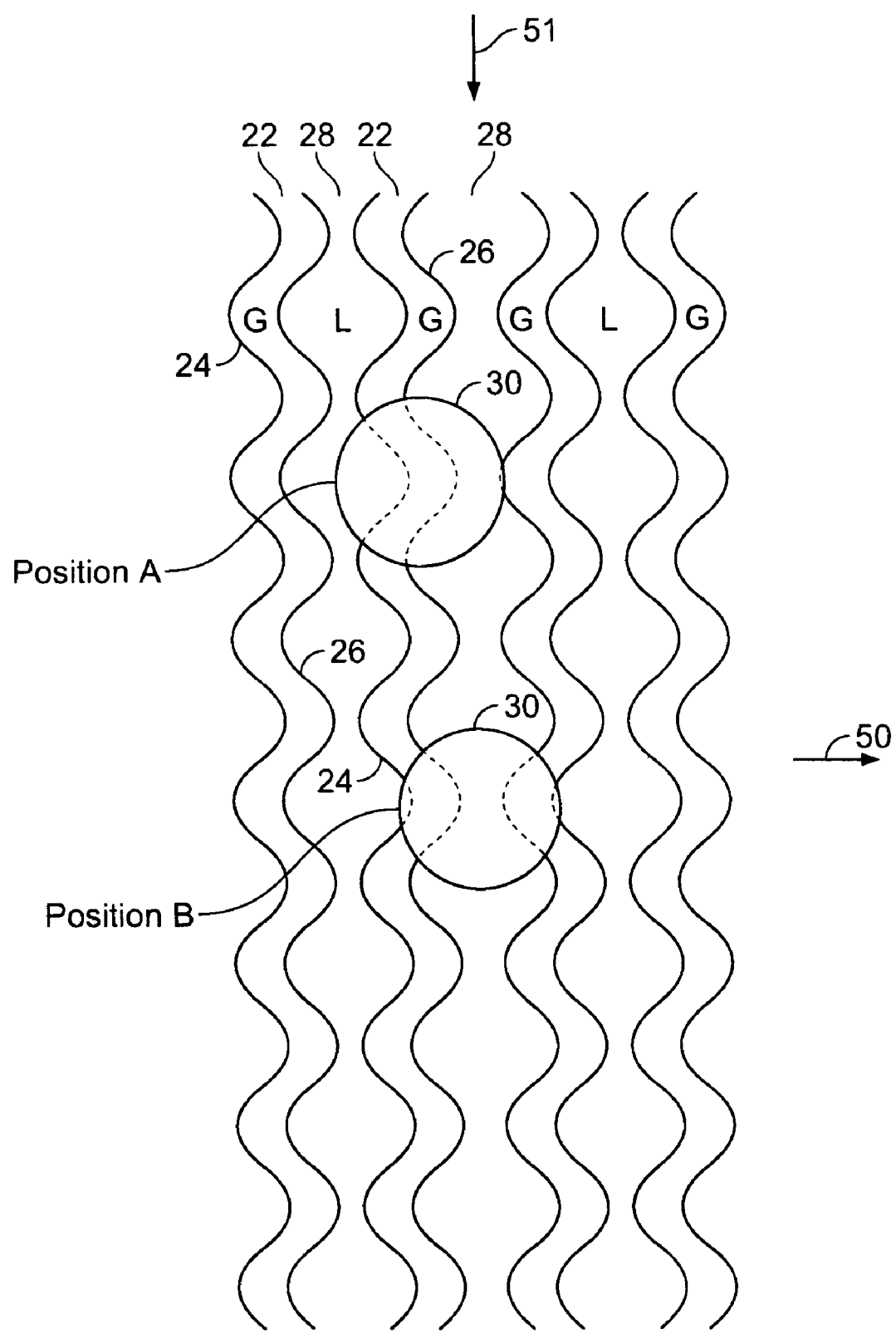
FIG. 5 shows groove tracks and land tracks.

Referring to FIG. 5, in one example, each groove track 22 has borders 24 and 26 that are configured to be parallel to each other. The borders 24 and 26 have recurring deviations (wobbles) that are in-phase, i.e., they shift in the same direction. Each land track 28 shares the borders of adjacent groove tracks. Because the borders of two groove tracks are not necessarily in-phase, the two borders of a land track may not be parallel to each other. In the example shown in FIG. 5, the borders of each land track 28 wobble in directions that are opposite of each other. Depending on whether the laser beam 30 is at a groove track 22 (such as in position A) or a land track 28 (such as in position B), the cross section of the reflected laser beam 30 will have different intensity patterns as the pickup head 20 scans the track along a tangential direction 51 of the tracks.

In the examples below, unless stated otherwise, the groove tracks are configured to have reflectances that are lower than the land tracks.

Figure 6:
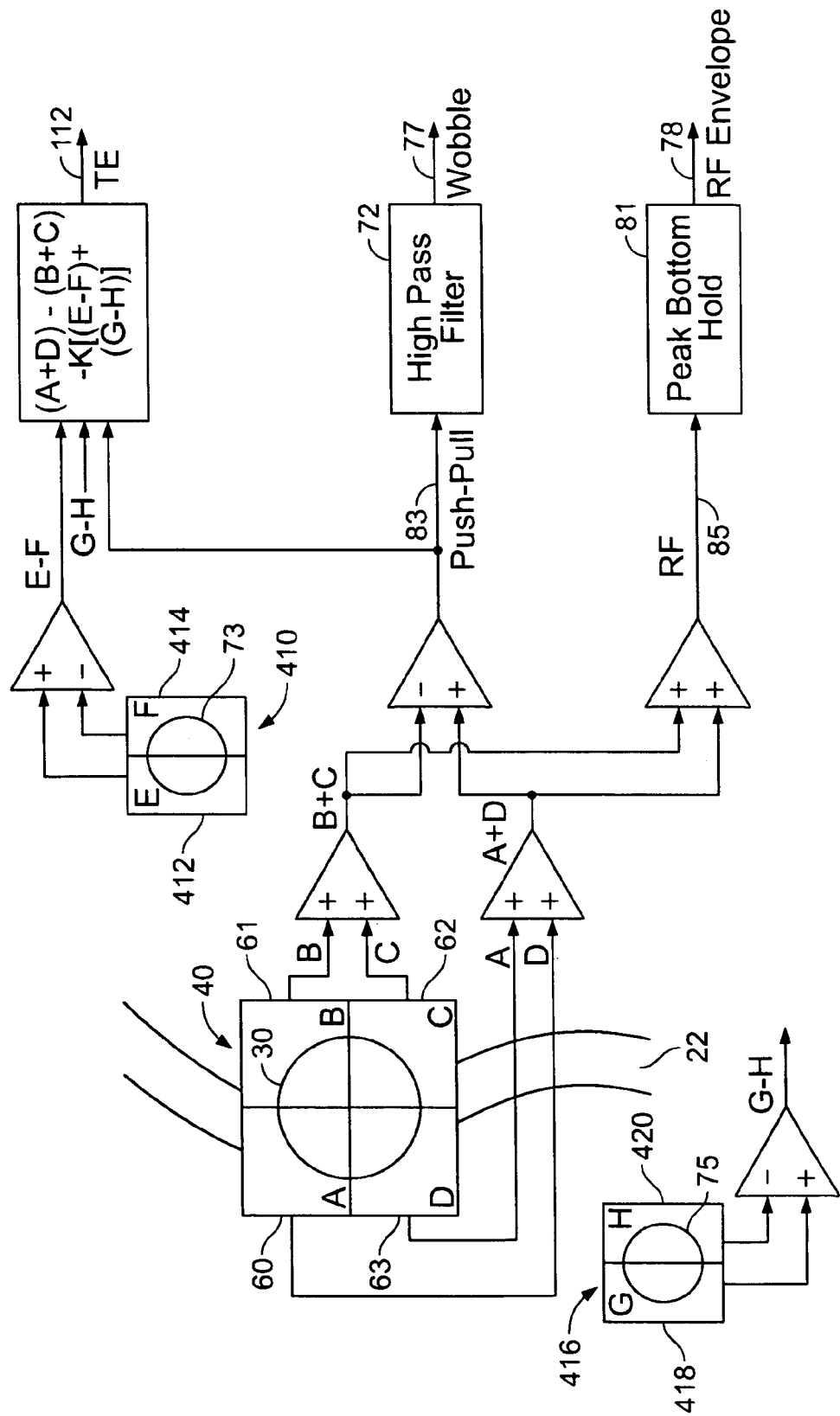
FIG. 6 shows schematic diagram of modules for generating a tracking error signal, a wobble signal, and an RF signal.

FIG. 6 shows a schematic diagram of modules for generating a tracking error signal 112, a wobble signal 77, and an RF envelope signal 78 based on the intensity patterns of the cross section of the reflected laser beam 30. A quad-section photodetector 40 (which is included in the pickup head 20) has four independent photo sensors 60, 61, 62, and 63 that detect the intensities of four quadrants of the cross section of the reflected laser beam 30 to generate output signals A, B, C, and D, respectively.

The signals A, B, C, and D are processed to generate a difference signal, referred to as a push-pull signal 83, having a value of (A+D)−(B+C), and a sum signal, referred to as an RF signal 85, having a value of A+B+C+D. The push-pull signal 83 has information about the recurring deviations (wobbles) of the tracks. The RF signal 85 has information about data, if any, recorded in the tracks. In some situations described below, the RF signal 85 also has information about the recurring deviations of the tracks.

The push-pull signal 83 is forwarded to a high-pass filter 72 to generate the wobble signal 77. The cut-off frequency of the high-pass filter 72 is selected to allow signals containing information about the recurring deviations of the track borders to pass. A band-pass filter can also be used instead of the high-pass filter 72.

The RF signal 85 is forwarded to a peak-bottom-hold device 81 to generate the RF envelope signal 78, which represents the envelope of the RF signal 85. In one example, the RF envelope signal 78 has a 90 degree phase difference relative to the tracking error signal 112.

In one example, the tracking error signal 112 is generated by using the push-pull signal 83 and signals derived from secondary beams 73 and 75, which are also generated by the pickup head 20. A bi-section photodetector 410 has two independent photo sensors 412 and 414 that detect the intensities of two bi-sections of the cross section of the reflected laser beam 73 to generate output signals E and F, respectively. Similarly, a bi-section photodetector 416 has two independent photo sensors 418 and 420 that detect the intensities of two bi-sections of the cross section of the reflected laser beam 75 to generate output signals G and H, respectively. The output signals A to H are processed by a tracking error signal generator according to the following equation to generate a tracking error signal 112:

$$\text{Tracking\_error} = [(A+D)-(B+C)] - k[(E-F)+(G-H)], \quad \text{(Equ. 1)}$$

where k is a weighting coefficient. Other methods of generating the tracking error signal 112 may be used.

The optical recording system 10 samples the wobble signal 77 when the pickup head 20 is at the centers of tracks (represented by the tracking error signal 112 being zero), and compares the amplitudes of the sampled wobble signals 77. If the amplitude of the wobble signal 77 sampled at a particular track $T_n$ is larger than the amplitude of the wobble signal 77 sampled at an adjacent track Track$_{n-1}$ or Track$_{n+1}$, the optical recording system 10 determines that the particular track Track$_n$ is a groove track 22, and the adjacent tracks Track$_{n-1}$ and Track$_{n+1}$ are land tracks 28.

Conversely, if the amplitude of the wobble signal 77 sampled at a particular track Track$_n$ is smaller than the amplitude of the wobble signal 77 sampled at an adjacent track Track$_{n-1}$ or Track$_{n+1}$, the optical recording system 10 determines that the particular track Track$_n$ is a land track 22, and the adjacent tracks Track$_{n-1}$ and Track$_{n+1}$ are groove tracks 28. Being able to quickly determine whether the pickup head 20 is at a groove track 22 or a land track 28 allows the optical recording system 10 to quickly seek and stably lock on to a particular track on the optical disc 12.

Figure 7:
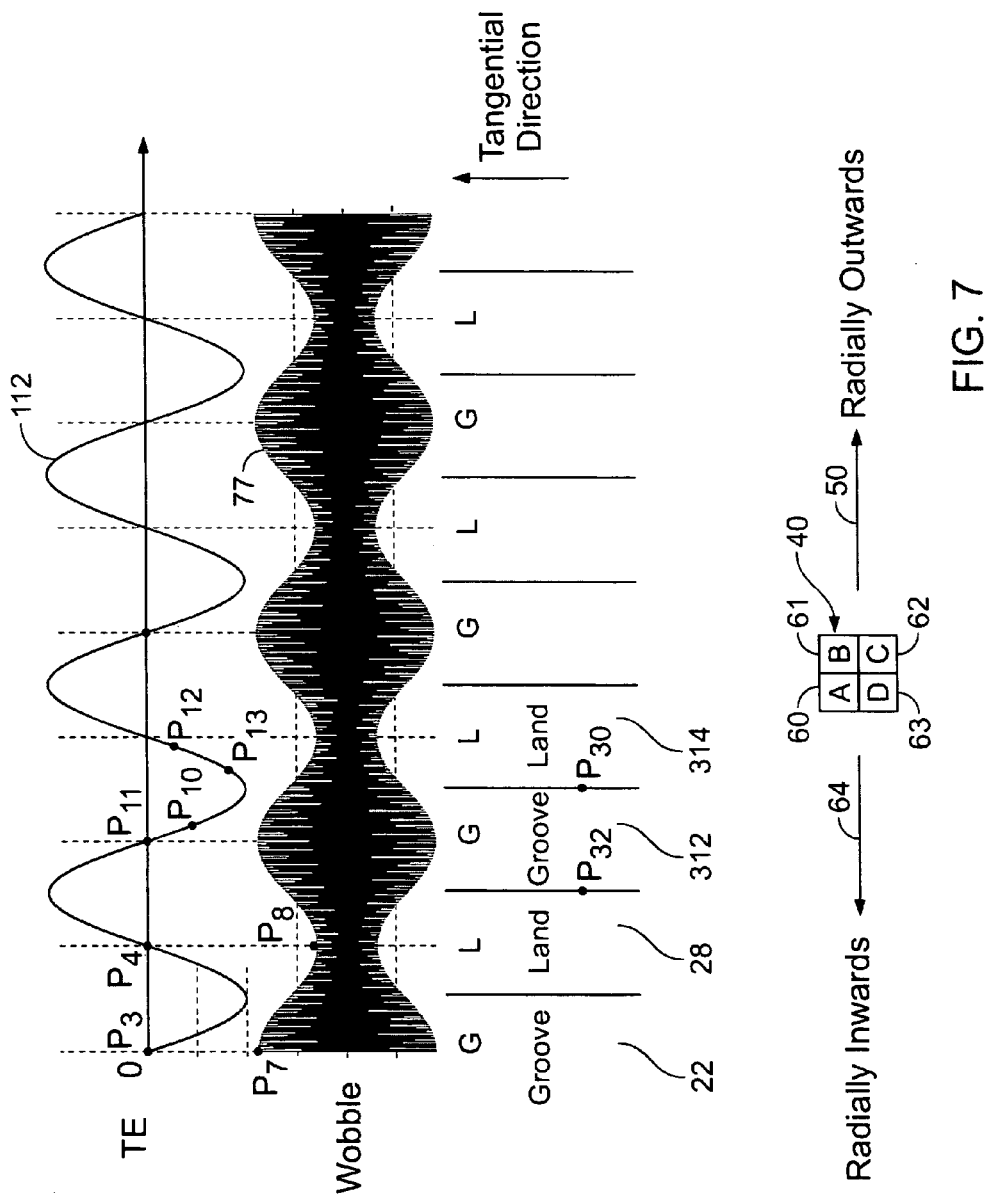
FIG. 7 shows a simulation of a tracking error signal and a wobble signal.

FIG. 7 shows a simulation of a tracking error signal 112 and a wobble signal 77 that are measured over time as the pickup head 20 scans the tracks and, at the same time, moves in a radially outward direction (relative to a center hole of the disc 20). The tracking error signal 112 has a zero value when the pickup head 20 is at the center of either a groove track or a land track (see points $P_3$ and $P_4$). The wobble signal 77 has a carrier frequency that is substantially equal to a carrier frequency of the wobbles in the track borders. As the pickup head 20 moves radially outwards, the amplitude of the envelope of the wobble signal 77 varies depending on the position of the pickup head 20 relative to a groove track or a land track. For example, when the pickup head 20 is at a groove track 22, such as represented by point $P_7$, the amplitude of the envelope is larger, and when the pickup head 20 is at a land track 28, such as represented by point $P_8$, the amplitude of the envelope is smaller.

The tracking error signal 112 can be derived using Equ. 1. Because the land track 28 has a higher reflectance than the groove track 22, the tracking error signal 112 is lower when the pickup head 20 is positioned at a border of the groove and land track (e.g., $P_{30}$) such that the photosensors 61 and 62 (which output B+C) detect light reflected from the land track and the photosensors 60 and 63 (which output A+D) detect light reflected from the groove track. On the other hand, the tracking error signal 112 is higher when the pickup head 20 is positioned at a border of the groove and land track (e.g., $P_{32}$) such that the photosensors 61 and 62 detect light reflected from the groove track and the photosensors 60 and 63 detect light reflected from the land track.

The quad-section photo detector 40 is oriented so that the photo sensors 60 and 63 are positioned radially inwards relative to the photo sensors 61 and 62. When the pickup head 20 is moving radially outwards relative to the tracks (as represented by an arrow 50), and the signal level of the tracking error signal 112 is measured over time, the slope of tracking error signal 112 is positive when the pickup head 20 is at a land track 28, and negative when at a groove track 22. Conversely, when the pickup head 20 is moving radially inwards relative to the tracks (as represented by an arrow 64), and the signal level of the tracking error signal 112 is measured over time, the slope of tracking error signal 112 is negative or positive when the pickup head 20 is at a land track 28 or a groove track 22, respectively.

Figure 8:
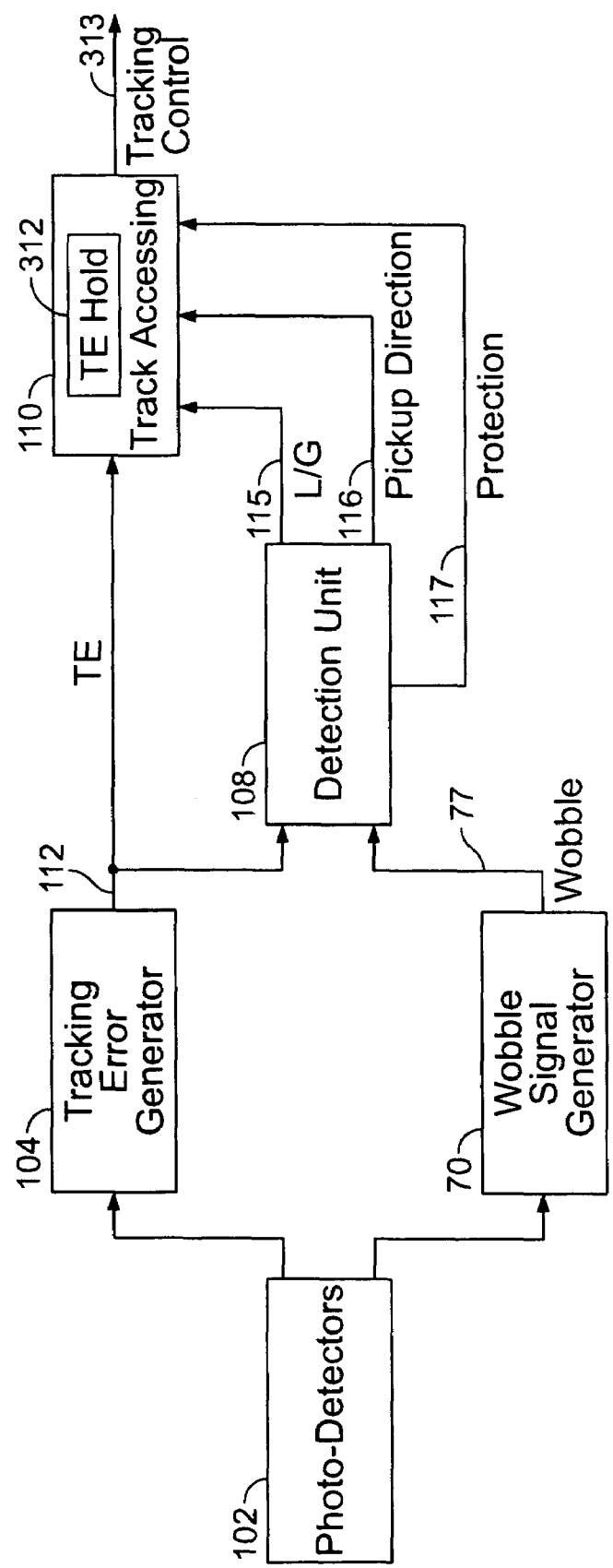
FIG. 8 shows a block diagram of modules for generating a tracking control signal.

FIG. 8 shows a block diagram of modules for generating a tracking control signal 313 for controlling the pickup head 20 when accessing a track. Photodetectors 102 detect the reflected laser beams 30, 73, and 75, and output the detected signals to a tracking error generator 104 and a wobble signal generator 70. The tracking error generator 104 generates a tracking error signal 112, and the wobble signal generator 70 generates a wobble signal 77, in which both signals 112 and 77 are sent to a detection unit 108. The detection unit 108 samples the wobble signal 77 when the tracking error signal 112 is zero, compares the amplitudes of the sampled wobble signals, determines whether the pickup head 20 is at a groove track 22 or a land track 28 based on the comparison, and generates a land/groove track signal (abbreviated as land/groove signal) 115. In one example, the land/groove signal 115 has a value 1 or 0 when the pickup head 20 is at a groove track 22 or a land track 28, respectively.

The detection unit 108 also generates a pickup head movement direction signal 116 (abbreviated as pickup movement direction signal), representing the direction of the movement of the pickup head 20 in the radial direction relative to the disc 12, based on the comparison of the sampled wobble signals. The pickup movement direction signal 116 can be, for example, based on information about the slope of the tracking error signal 112 and information about whether the pickup head 20 is at a land track 28 or a groove track 22. In one example, the pickup movement direction signal 116 has a value 1 (high) or 0 (low) when the pickup head 20 is moving radially outwards or inwards, respectively, relative to the tracks.

The tracking error signal 112, the land/groove signal 115, and the pickup movement direction signal 116 are sent to a track accessing unit 110 that controls the position of the pickup head 20 (as well as the position of the laser beam 30 of the disc 12). The host computer 19 may request data that is stored at a particular track. For example, when the disc 12 is a CD-R, CD-RW, DVD+R, DVD+RW, DVD-R, DVD-RW, Blu-ray Recordable (BD-R), or Blu-ray Rewritable (BD-RW) disc, data is written in the groove track. For these types of discs, the track accessing unit 110 locks the pickup head 20 onto groove tracks for read/write operations.

In one example, when the track accessing unit 110 attempts to lock the pickup head 20 to a particular groove track 312 (see FIG. 7), the track accessing unit 110 uses a negative feedback control loop to control the position of the pickup head 20 so that the TE signal 112 is equal to zero. For example, the negative feedback loop may cause the pickup head 20 to move radially inwards if the TE signal 112 is less than zero, and move radially outwards if the TE signal 112 is greater than zero. The greater the absolute value of the TE signal 112, the greater the force is applied to the pickup head 20 to move it toward the center of the track. Suppose the track accessing unit 110 determines that the pickup head 20 is at $P_{10}$, where the TE signal 112 is less than zero, the track accessing unit 110 moves the pickup head 20 inwards so that eventually the pickup head 20 is at point $P_{11}$, where the TE signal 112 is zero.

If the pickup head 20 is above a land track (e.g., 314), the negative feedback loop cannot be used. The negative feedback loop, which is designed for moving the pickup head 20 to the center of a groove track (e.g., 312), produces a positive feedback when the pickup head 20 is at a land track (e.g., 314). For example, if the pickup head 20 is at point $P_{12}$, the negative feedback loop will cause the pickup head 20 to move radially inwards, and the farther the pickup head 20 moves inwards, such as to point $P_{13}$, the greater force is applied to move the pickup head 20 inwards, resulting in instability, and may cause further sliding of the pickup head 20 to the wrong track.

In one example, to increase the locking capability of the track accessing unit 110, the unit 110 includes a TE hold mechanism 312 to hold the value of a sampled TE signal 112 when the pickup head 20 is at a land track. When the pickup head 20 is moving radially outwards, the TE hold mechanism 312 only allows the TE signal 112 to decrease from the held value while the pickup head 20 is still at a land track (either the same land track as when the TE value was held or a different land track). When the pickup head 20 is moving radially inwards, the hold mechanism 312 only allows the TE signal 112 to increase from the held value while the pickup head 20 is still at a land track (either the same or a different land track).

There are a number of ways to determine which value of the sampled TE signal is held by the TE Hold mechanism 312. In one example, when the pickup head 20 is moving radially inwards or outwards, the held value is the maximum or minimum, respectively, of the TE value that was sampled during the period that the pickup head 20 is at the land track.

By sending the held TE value (instead of the currently sampled TE value) to the negative feedback loop, the sliding of the pickup head 20 at the land track is reduced. The track accessing unit 110 can start the process of locking the pickup head 20 when the pickup head 20 is above either a land track or a groove track.

When the pickup head 20 moves to a groove track, the TE hold mechanism 312 stops holding the TE value, and the TE signal 112 as measured is sent to the negative feed back loop so that the pickup head 20 can be locked to the center of the groove track.

The detection unit 108 generates a protection signal 117 that indicates whether the land/groove signal 115 and the pickup movement direction signal 116 can be used during track accessing. For example, there may be glitches in the land/groove signal 115 and the pickup movement direction signal 116, and thus those signals should not be used. The protection signal 117 indicates whether the TE hold mechanism should be disabled and not hold the TE value even when the land/groove track signal 115 indicates that the pickup head 20 is at a land track. The protection signal 117 also indicates whether the pickup head 20 is at a border of a data area and a blank area, such that there may be discontinuity in the wobble signal, and thus should not be used. The protection signal 117 is described in more detail below.

Three methods of generating the land/groove signal 115 and the pickup direction signal 116 are provided below.

First Method of Generating L/G Signal and Pickup Direction Signal

Figure 9:
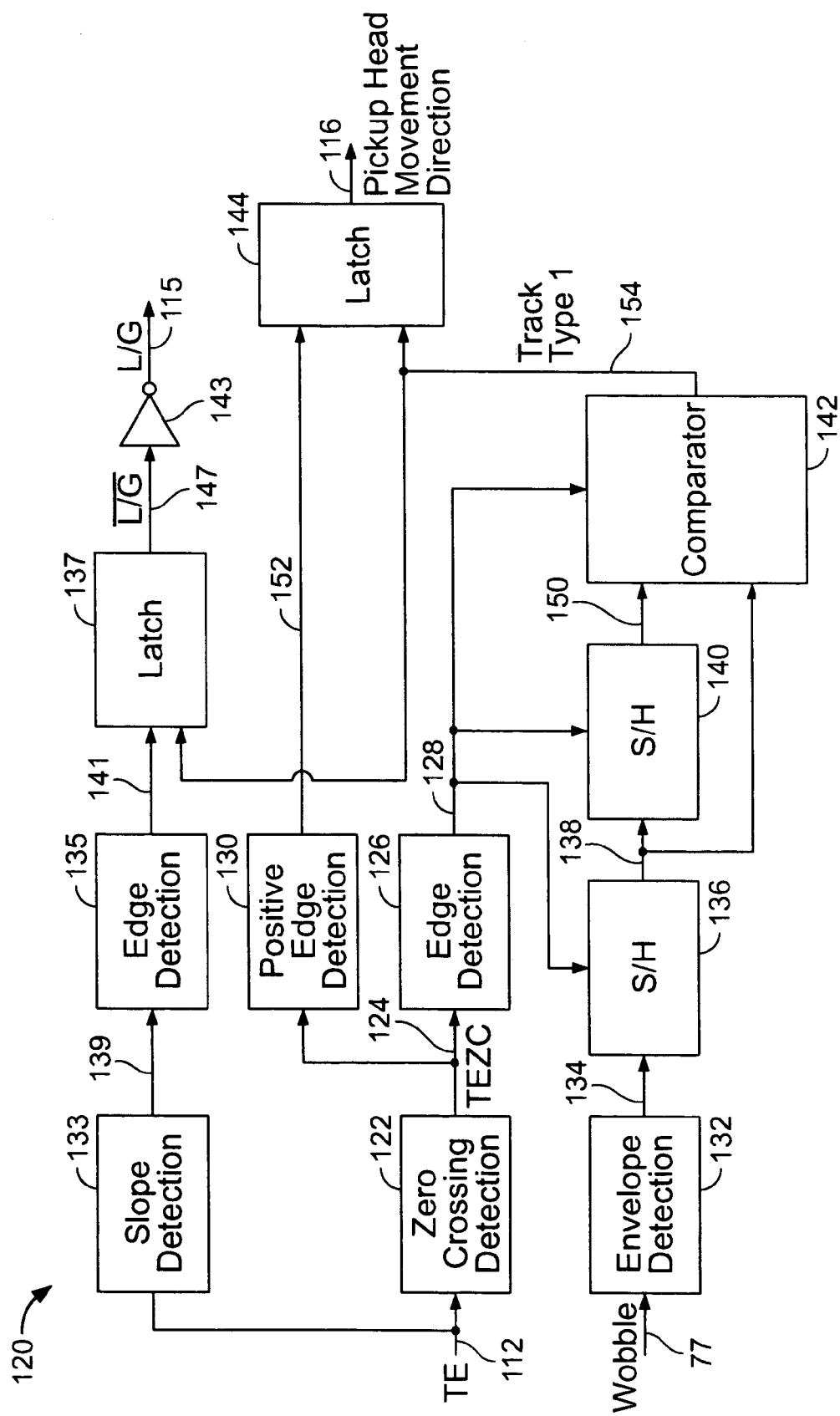
FIG. 9 shows a land/groove track and pickup head movement direction detection device.

FIG. 9 shows an example of a land/groove track and pickup head movement direction detection device 120. The envelope of a wobble signal 77 is sampled at least twice during successive instances in which a tracking error signal 112 is equal to zero. The two sampled values are compared to generate a first track type signal 154 that indicates whether the pickup head 20 was at or near the center of a land track or a groove track when the wobble signal 77 was sampled. A land/groove signal 115 is derived from the first track type signal 154 to indicate whether the current track is a land track or a groove track (the current track refers to the track where the pickup head 20 is currently at).

Figure 10:
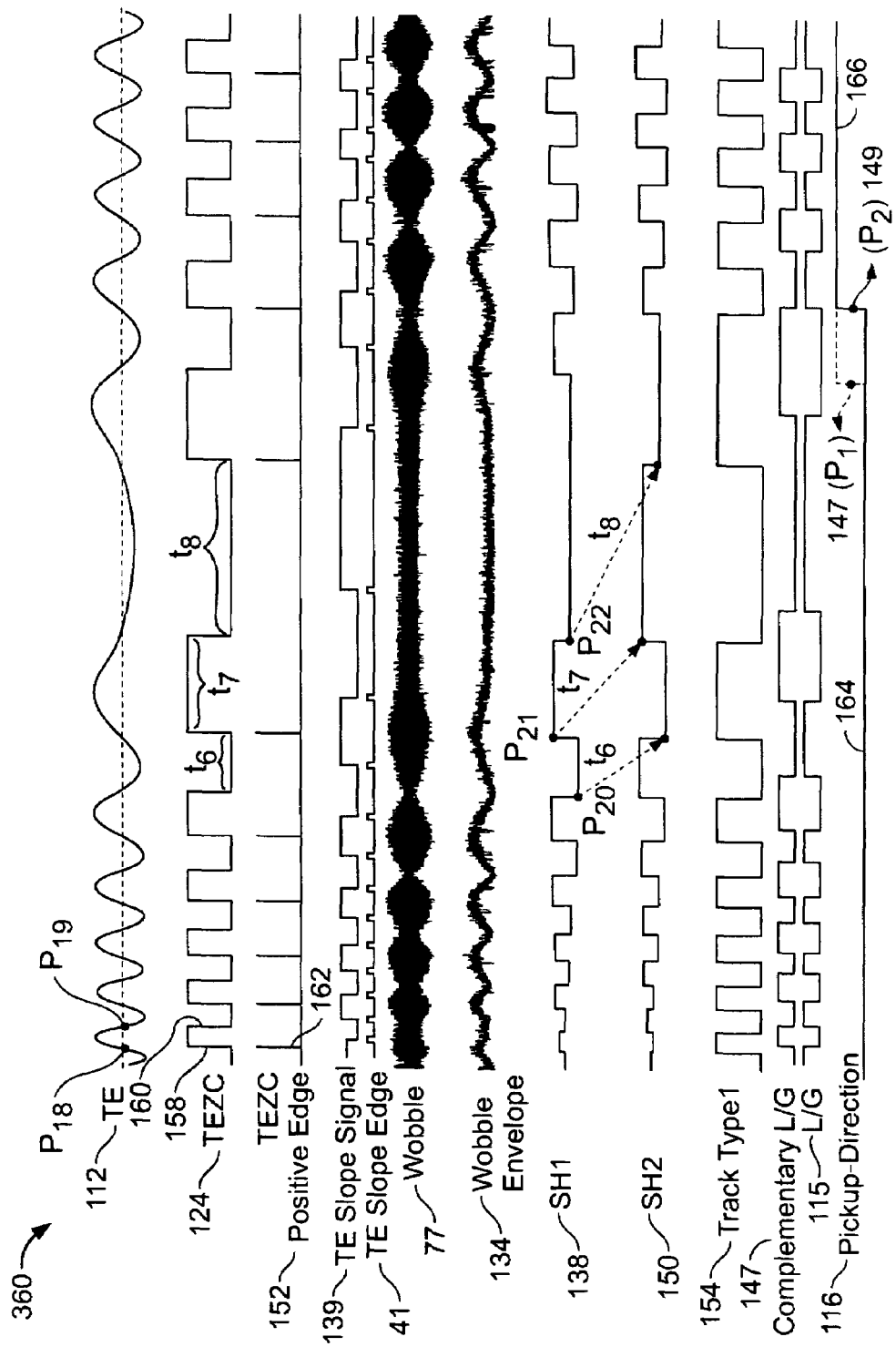
FIG. 10 shows graphs of signals generated by the device of FIG. 9.

FIG. 10 shows graphs 360 of signals generated by the units of the device 120. Below is a description of how the land/groove signal 115 is generated, followed by a description of how the pickup direction signal 116 is generated.

A zero crossing detection unit 122 receives a tracking error signal 112, determines when the tracking error signal 112 is equal to zero (e.g., at $P_{18}$ and $P_{19}$), and outputs a tracking error zero crossing (TEZC) signal 124. The TEZC signal 124 has a rising edge (e.g., 158) when the tracking error signal 112 becomes zero and the slope of the tracking error signal 112 is positive. The TEZC signal 124 has a falling edge (e.g., 160) when the tracking error signal 112 becomes zero and the slope of the tracking error signal 112 is negative. An edge detection unit 126 generates a pulse signal 128 that has pulses indicating the locations where the TEZC signal 124 has rising or falling edges. A positive edge detection unit 130 generates a pulse signal 152 that has pulses (e.g., 162) indicating the locations of rising edges in the TEZC signal 124.

An envelope detection unit 132 receives a wobble signal 77, determines the envelope of the wobble signal 77, and generates a wobble envelope signal 134. In one example, the envelope detection unit 132 determines the envelope of the wobble signal 77 by holding the highest or lowest value of each cycle in the wobble signal 77, by subtracting the lowest value from the highest value of each cycle in the wobble signal 77, or by taking the highest value of the absolute value of wobble signal in each wobble cycle. A sample-and-hold unit 136 samples and holds the value of the wobble envelope signal 134 when there is a pulse in the pulse signal 128 (which represents an edge in the TEZC signal 124), and outputs a sampled value (Wobble_SH1) 138. The sample-and-hold unit 136 can be analog or digital (which may use an analog-to-digital converter to sample the wobble envelope signal). A second sample-and-hold unit 140 delays the sampled value 138 for a half-cycle of the TEZC signal 124, and outputs a delayed sampled value (Wobble_SH2) 150. For example, the sampled value at $P_{20}$ is delayed for an amount of time equal to $t_6$, the half-cycle of TEZC signal 124. Similarly, the sampled value at $P_{21}$ is delayed for an amount of time equal to $t_7$, and the sampled value at $P_{22}$ is delayed for an amount of time equal to $t_8$.

At rising or falling edges of the TEZC signal 124, a comparator 142 compares the delayed sampled value 150 and a more recently sampled value 138, and outputs the first track type signal 154. If the more recently sampled value 138 is larger than the delayed sampled value 150, the first track type signal 154 will have a value 1 at the edge of the TEZC signal 124, indicating that the pickup head 20 was at the center of a groove track when the more recently sampled value was measured. Conversely, if the more recently sampled value 138 is smaller than the delayed sampled value 150, the first track type signal 154 will have a value 0 at the edge of the TEZC signal 124, indicating that the pickup head 20 was at the center of a land track when the more recently sampled value was measured.

The first track type signal 154 allows the system 10 to determine whether the pickup head 20 is at a land track or a groove track after one-half of the track has been traversed (this is because the comparison of two sampled wobble envelope values is performed when the TE signal is zero, which occurs when the pickup head 20 is at the center of the track).

The first track type signal 154 can be time-shifted to generate the land/groove signal 115 that provides information about whether the pickup head 20 is at a groove track or a land track near the beginning of the track.

A slope detection unit 133 receives the tracking error signal 112 and generates a TE slope signal 139. An edge detection unit 135 detects the edges of the TE slope signal 139 to generate a slope edge signal 141. The slope edge signal 141 includes pulses that indicate the locations of the rising and falling edges of the TE slope signal 139, which approximately represent the locations of the track borders. A latch unit 137 latches the value of the first track type signal 154 when there is a pulse in the slope edge signal 141. The latched value 147 (referred to as a complementary land/groove signal) indicates the type of the previous track, i.e., a latched value of 1 or 0 indicates that the previous track is a land track or groove track, respectively. A NOT gate 143 reverses the polarity of the latched value 147 and generates the land/groove signal 115, which has a value of 1 or 0 when the pickup head 20 is at a groove track or a land track, respectively.

To determine the movement direction of the pickup head 20 relative to the disc 12, a latch unit 144 latches the value of the first track type signal 154 when triggered by a pulse in the pulse signal 152, and outputs the pickup movement direction signal 116. The rising and falling edges of the first track type signal 154 slightly lags the rising and falling edges, respectively, of the TEZC signal 124 because it takes a short amount of time for the comparator 152 to compared the two sampled signals. Thus, the value of the first track type signal 154 is latched a short amount of time after a pulse occurs in the pulse signal 152.

In one example, if the first track type signal 154 is equal to 1 (indicating that the pickup head 20 is at a groove track) when there is a positive edge in the TEZC signal 124 (indicating that the slope of the tracking error signal 112 is positive), the pickup movement direction signal 116 will have a value 0 (e.g., 164), indicating that the pickup head 20 is moving radially inwards. If the first track type signal 154 is equal to 0 when there is a positive edge in the TEZC signal 124, the pickup movement direction signal 116 will have a value 1 (e.g., 166), indicating that the pickup head 20 is moving radially outwards.

Figure 1:
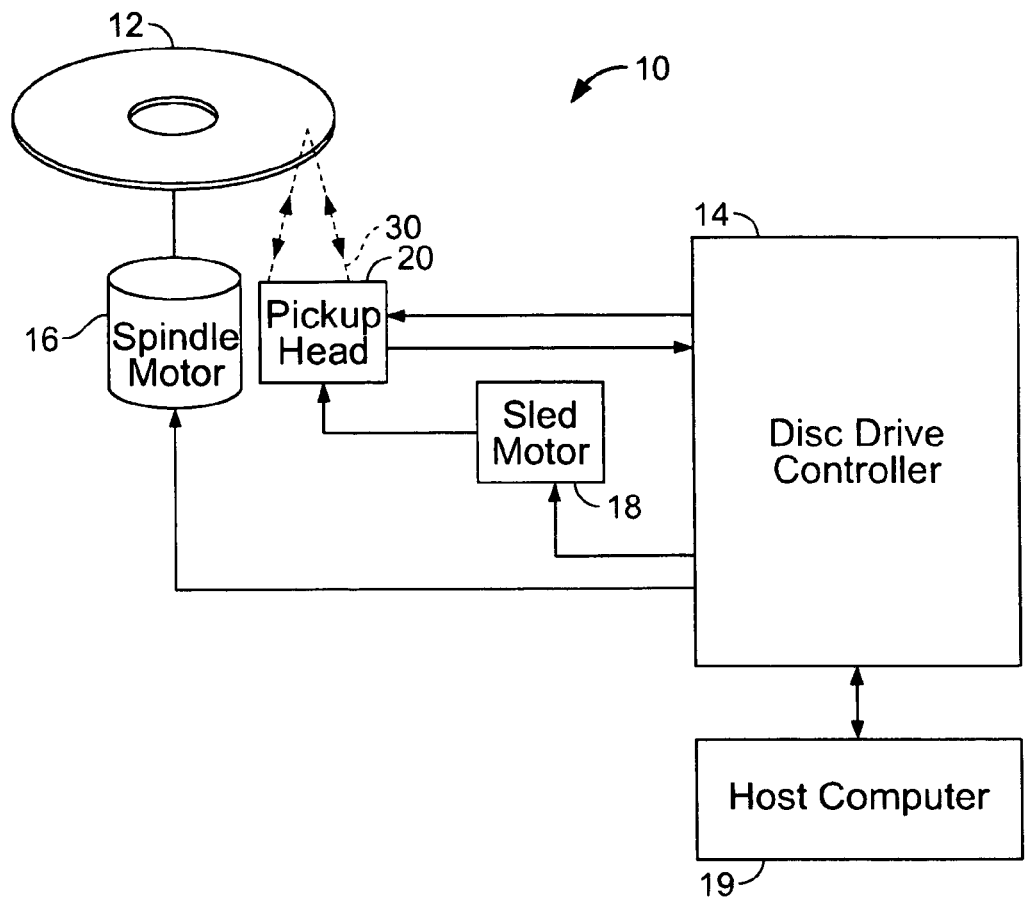
FIG. 1 shows an optical recording system.
Figure 2:
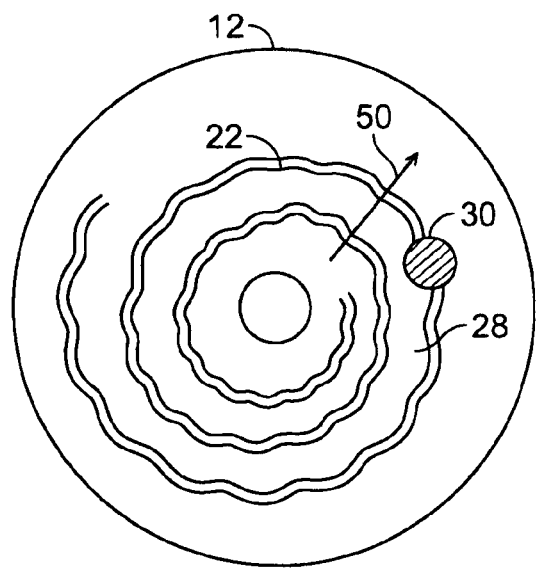
FIG. 2 shows an optical disc.
Figure 3:
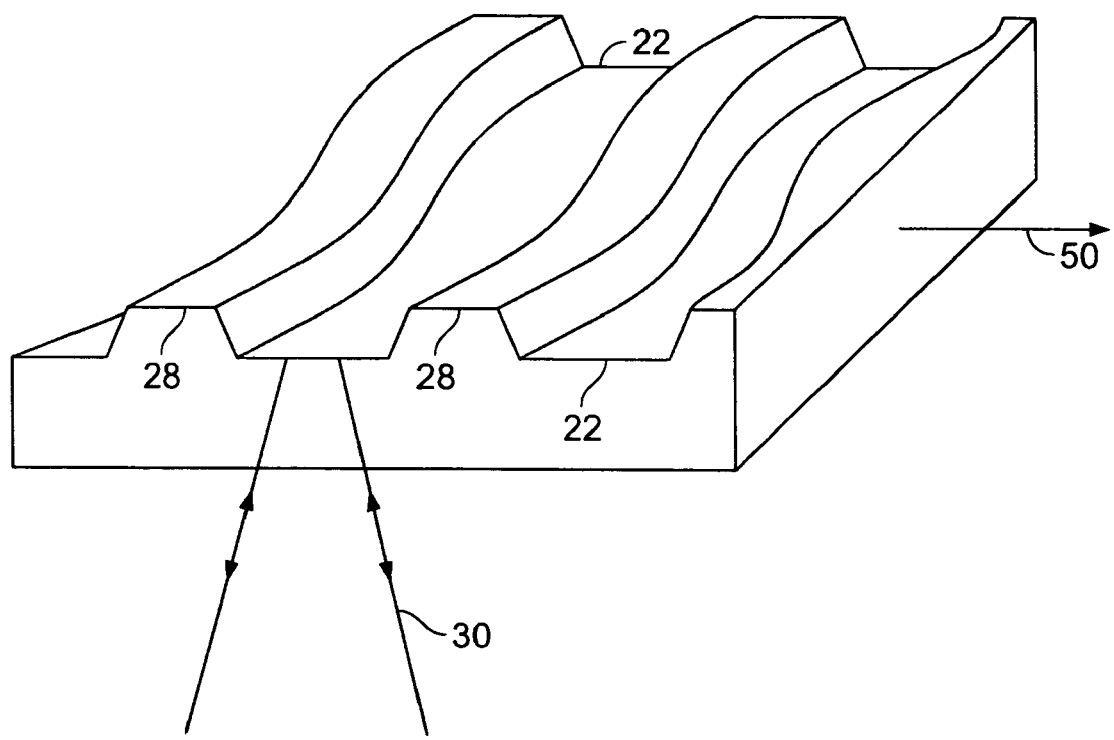
FIG. 3 shows a perspective view of land tracks and groove tracks on the optical disc.
Figure 4:
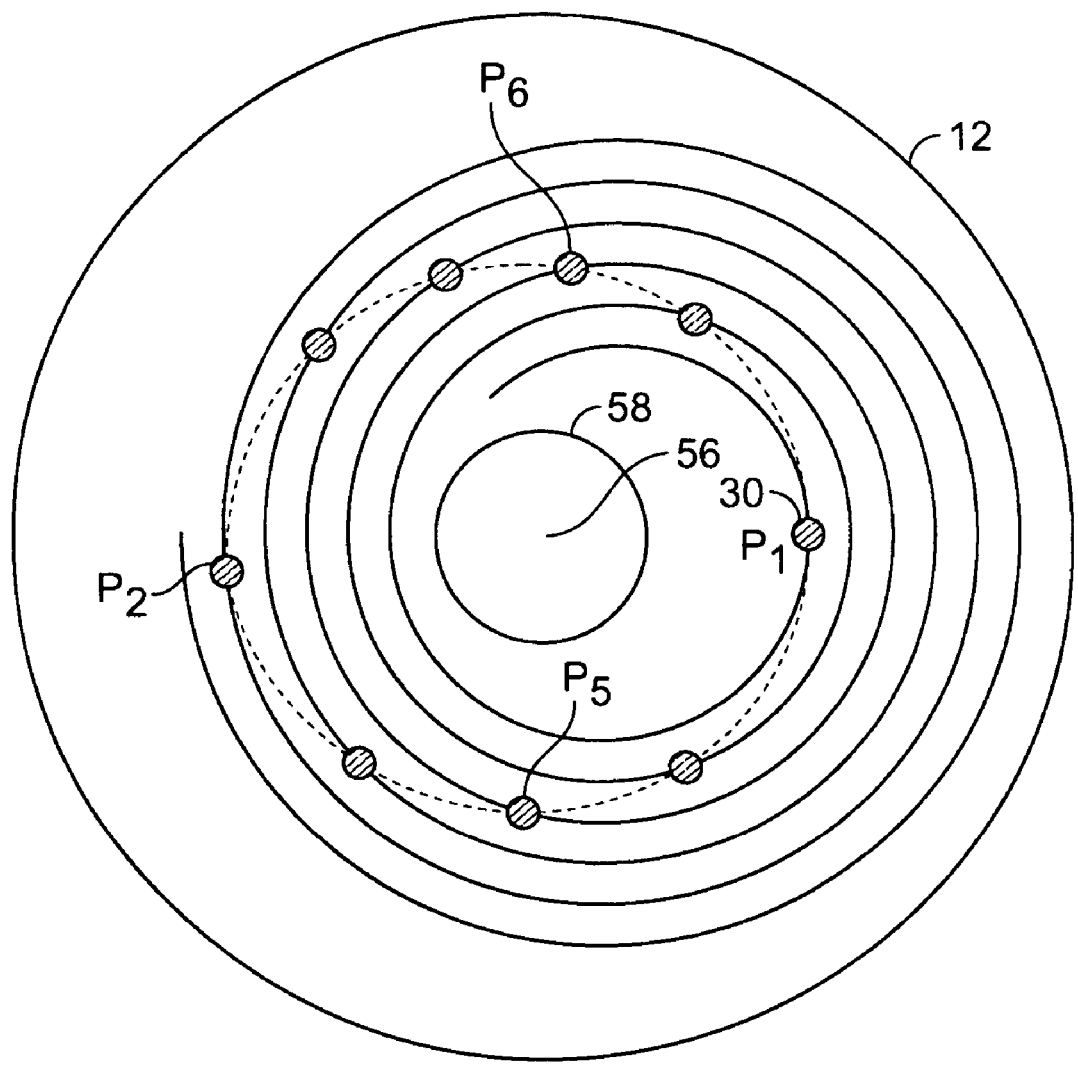
FIG. 4 shows an optical disc.

Using the device 120, when the pickup head 20 changes the radial movement direction, such as changing from moving radially inwards to moving radially outwards, as is the case at point P1 in FIG. 4, the pickup movement direction signal 116 will have a delay of half a cycle of the TEZC signal 124. For example, an edge 147 (shown in dashed line) represents the point where the direction of movement actually changes from inwards to outwards). The pickup direction signal 116 changes from 0 to 1 at an edge 149, lagging a half cycle of the TEZC signal 124.

To solve this problem, the pickup movement direction signal 116 can be generated by sampling the first track type signal 154 on both the positive edges and negative edges of the TEZC signal 124. If the first track type signal 154 is equal to 0 or 1 when there is a positive or negative edge, respectively, in the TEZC signal 124, the pickup movement direction signal 116 will have a value 1 (e.g., 164), indicating that the pickup head 20 is moving radially outwards. If the first track type signal 154 is equal to 1 or 0 when there is a positive or negative edge, respectively, in the TEZC signal 124, the pickup movement direction signal 116 will have a value 0, indicating that the pickup head 20 is moving radially outwards.

The device 120 will accurately determine the pickup head movement direction when the pickup head 20 changes from moving radially outwards to moving radially inwards, as is the case at point $P_2$ in FIG. 4.

Another method of generating the pickup movement direction signal 116 is to perform an XOR operation on the TEZC signal 124 and the first track type signal 154. Because the first track type signal 154 slightly lags the TEZC signal 124, the TEZC signal 124 is delayed for the same amount of time prior to performing the XOR operation.

In one example, the land/groove signal 115 can be generated by performing an XOR operation on the pickup direction signal 116 and the TE slope signal 139, following by a NOT operation:

Land/groove signal=*NOT*(*XOR*(pickup movement direction signal, *TE* slope))

Because the pickup movement direction signal 116 slightly lags the TE slope signal 139, the TE slope signal 139 is delayed for the same amount of time prior to performing the XOR operation.

In one example, the pickup movement direction signal 116 can be generated by latching the complementary land/groove type signal 147 at the rising edge of the TEZC signal. If the complementary land/groove signal 147 is 0 at the rising edge of the TEZC signal, then the pickup movement direction signal 116 is 0 (indicating that the pickup head 20 is moving radially inwards). Conversely, if the complementary land/groove signal 147 is 1 at the rising edge of the TEZC signal, then the pickup movement direction signal 116 is 1 (indicating that the pickup head 20 is moving radially outwards).

The land/groove signal 115 and the pickup movement direction signal 116 can both be derived from the TEZC signal 124 and the first track type signal 154. Thus, the land/groove signal 115 can be derived from the TEZC signal 124 and the pickup direction signal 116. Similarly, the pickup direction signal 116 can be derived from the TEZC signal 124 and the land/groove signal 115. In FIG. 8, the track accessing unit 110 can use either the land/groove signal 115 or the pickup movement direction signal 116 for controlling the position the pickup head 20 and the laser beam 30.

In FIG. 10, the tracking error signal 112 has a frequency that first decreases then increases, indicating that the pickup head 20 moved first inwards relative to the tracks, stopped, then reversed direction and moved outwards.

Second Method of Generating L/G Signal and Pickup Direction Signal

Figure 11:
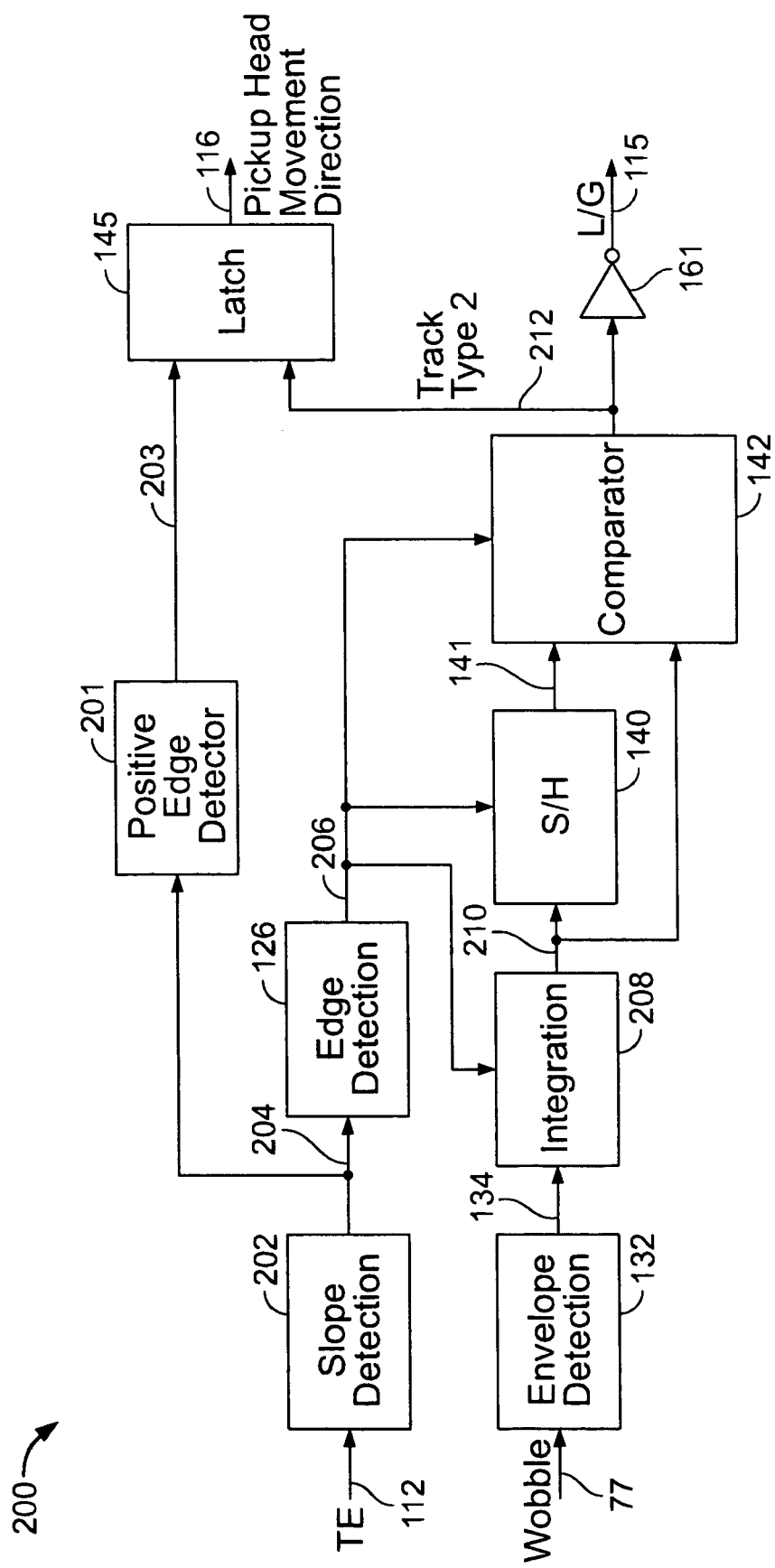
FIG. 11 shows a land/groove track and pickup head movement direction detection device.
Figure 12:
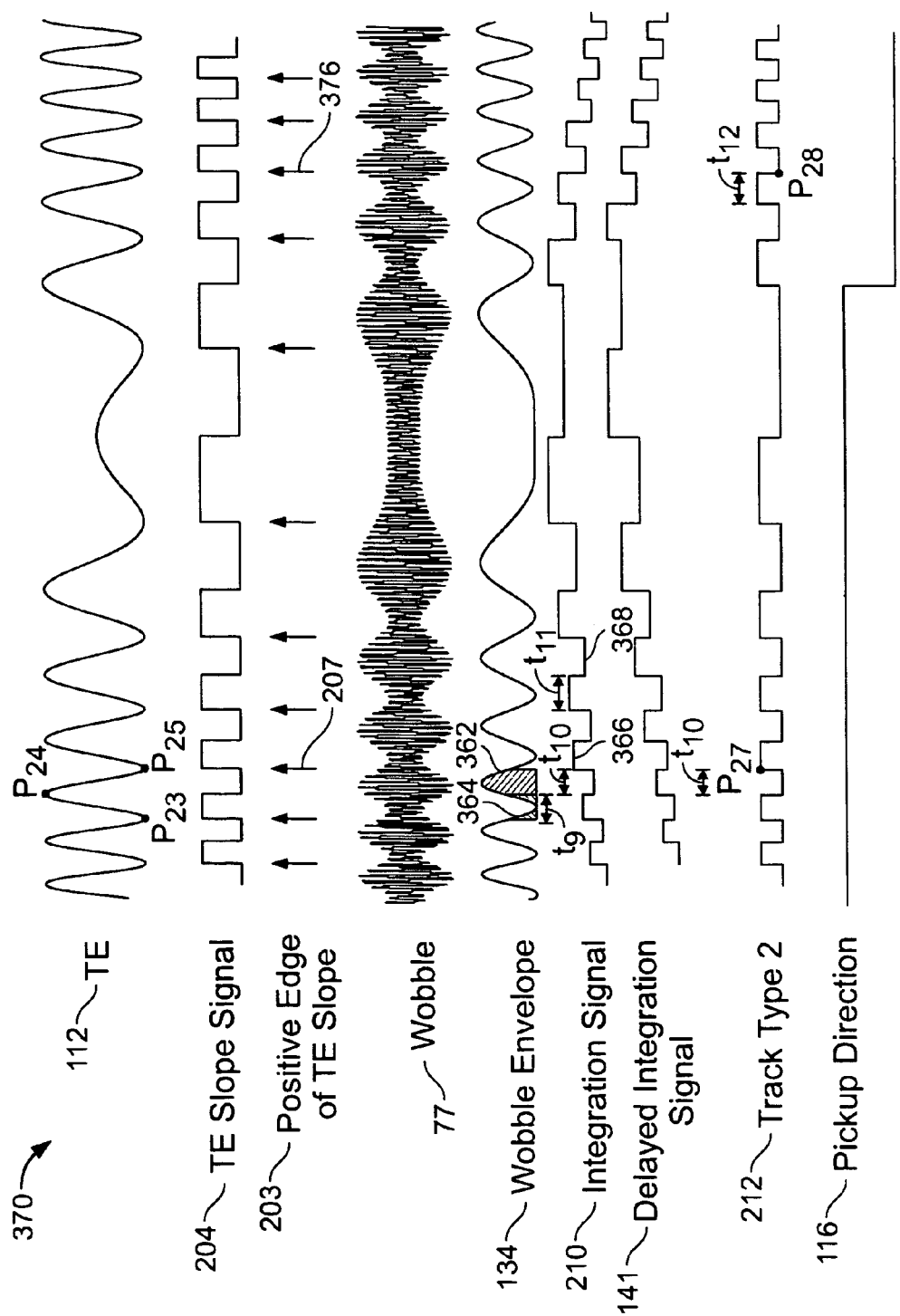
FIG. 12 shows graphs of signals generated by the device of FIG. 11.

FIG. 11 shows an example of a land/groove track and pickup head movement direction detection device 200. FIG. 12 shows graphs 370 of signals generated by the units of the device 200.

A slope detection unit 202 receives a tracking error signal 112, determines when the tracking error signal 112 has a positive slope (e.g., from $P_{23}$ to $P_{24}$ in FIG. 12) and a negative slope (e.g., from $P_{24}$ to $P_{25}$), and outputs a tracking error slope signal 204. The tracking error slope signal 204 has a value 1 or 0 when the tracking error signal 146 has a positive or negative slope, respectively. An edge detection unit 126 generates a pulse signal 206 that has pulses indicating the locations where the tracking error slope signal 204 changes from 1 to 0, or from 0 to 1. A positive edge detection unit 201 generates a pulse signal 203 that has pulses (e.g., 207) indicating the locations where the tracking error slope signal 204 changes from low to high.

An envelope detection unit 132 receives a wobble signal 77 and generates a wobble envelope signal 134. An integration unit 208 integrates the values of the wobble envelope signal 134 during a time interval (e.g., $t_9$ or $t_{10}$) between pulses in the pulse signal 206 (which represent edges in the slope detection signal 204) to generate an integral value, represented by the integration signal 210. The integration unit 208 has a function that is similar to the sample and hold unit 136 in FIG. 9, except that the integration unit 208 integrates the values of the wobble envelop signal 134 over time, which can reduce the effects caused by noise in the wobble signal 77 or inaccuracies in the measurement of the wobble signal 77.

Because the integration operation is performed over a time interval between two edges of the tracking error slope signal 204, a higher value (e.g., 366) in the integration signal 210 indicates that the wobble envelope signal 134 has a larger overall amplitude during a time interval (e.g., $t_{10}$) that the integration was performed. Conversely, a lower value (e.g., 368) in the integration signal 210 indicates that the wobble envelope signal 134 has a smaller overall amplitude in a time interval (e.g., $t_{11}$) that the integration was performed.

A sample-and-hold unit 140 delays the integration signal 210 for a half-cycle of the tracking error slope signal 204, and outputs a delayed integration signal 141. A comparator 142 compares the values of the delayed integration signal 141 and a more recent integration signal 210, and outputs a second track type signal 212.

If the more recent integration value 210 (e.g., a value that represents an area 362 that is integrated over time period t10) is larger than the delayed integration value 141 (e.g., a value that represents an area 364 that is integrated over time period $t_9$), the second track type signal 212 will have a value 1, indicating that the pickup head 20 is at a groove track in the time interval in which the more recent integration value 210 was computed. Conversely, if the more recent integration value 210 is smaller than the delayed integration value 141, the second track type signal 212 will have a value 0, indicating that the pickup head 20 is at a land track 28 in the time interval in which the more recent integration value 210 is computed.

The second track type signal 212 represents the type of track that the pickup head 20 is at, with a delay of one-half cycle of the tracking error signal 112. A land/groove signal 115 can be derived by passing the second track type signal 212 through a NOT gate 161.

A latch 145 latches the value of the second track type signal 212 when triggered by the pulse in the pulse signal 203 (indicating a positive edge of the tracking error slope signal 204), and outputs the latched value as a pickup movement direction signal 116. Because the second track type signal 212 indicates the position of the pickup head 20 at a previous time interval (between edges of the tracking error slope signal 204), the second track type signal 212 that is latched at a positive edge of the tracking error slope signal 204 indicates the pickup head movement direction at a time interval that ends at the positive edge.

For example, the second track type signal 212 (at $P_{27}$) that is latched at a positive edge of the TE slope signal (indicated by pulse 207) indicates the pickup head movement direction at a time interval (e.g., $t_{10}$) that ends at the positive edge (indicated by pulse 207). As another example, the second track type signal 212 (at $P_{28}$) that is latched at a positive edge of the TE slope signal 204 (indicated by pulse 376) indicates the pickup head movement direction at a time interval (e.g., $t_{12}$) that ends at the positive edge (indicated by pulse 376). If the pickup direction signal 116 has a value 0, it indicates that the pickup head 20 is moving inwards. Conversely, if the pickup direction signal 116 has a value 1, it indicates that the pickup head 20 is moving outwards.

In FIG. 12, the tracking error signal 112 has a frequency that first decreases then increases, indicating that the pickup head 20 first moved outwards relative to the tracks, stopped, then moved inwards.

The amplitude of the wobble signal 77 can sometimes be reduced to a small value (e.g., due to wobble beat) such that it may be difficult to compare two samples of wobble signals. The following is a description of the wobble beat. The wobble signal 77 is usually larger at a groove track than at adjacent land tracks because the two borders of a groove track are in-phase, while the two borders of a land track are not necessarily in-phase. Adjacent groove tracks (e.g., groove track n and groove track n+1) are positioned on the disc 12 at slightly different radiuses, so the phase differences between adjacent groove tracks increase (or decrease) gradually as the pickup head 20 traverses from an inner track to an outer track. As a result, as the pickup head 20 traverses from an inner track to an outer track, the adjacent groove tracks passed under the pickup head 20 become alternately in-phase and out-of-phase.

When adjacent groove tracks become out-of-phase, the two borders of the land track between the two groove tracks are out-of-phase, causing the difference in sampled wobble signals at the groove track and the land track to be larger. When adjacent groove tracks become in-phase, the two borders of the land track between the two groove tracks are also in-phase, causing the difference in sampled wobble signals at the groove track and the land track to be smaller. Therefore, as the pickup head 20 traverses from an inner track to an outer track, the difference in wobble signal amplitude for adjacent land and groove tracks alternately increases and decreases. This is referred to as the wobble beat.

Figure 13:
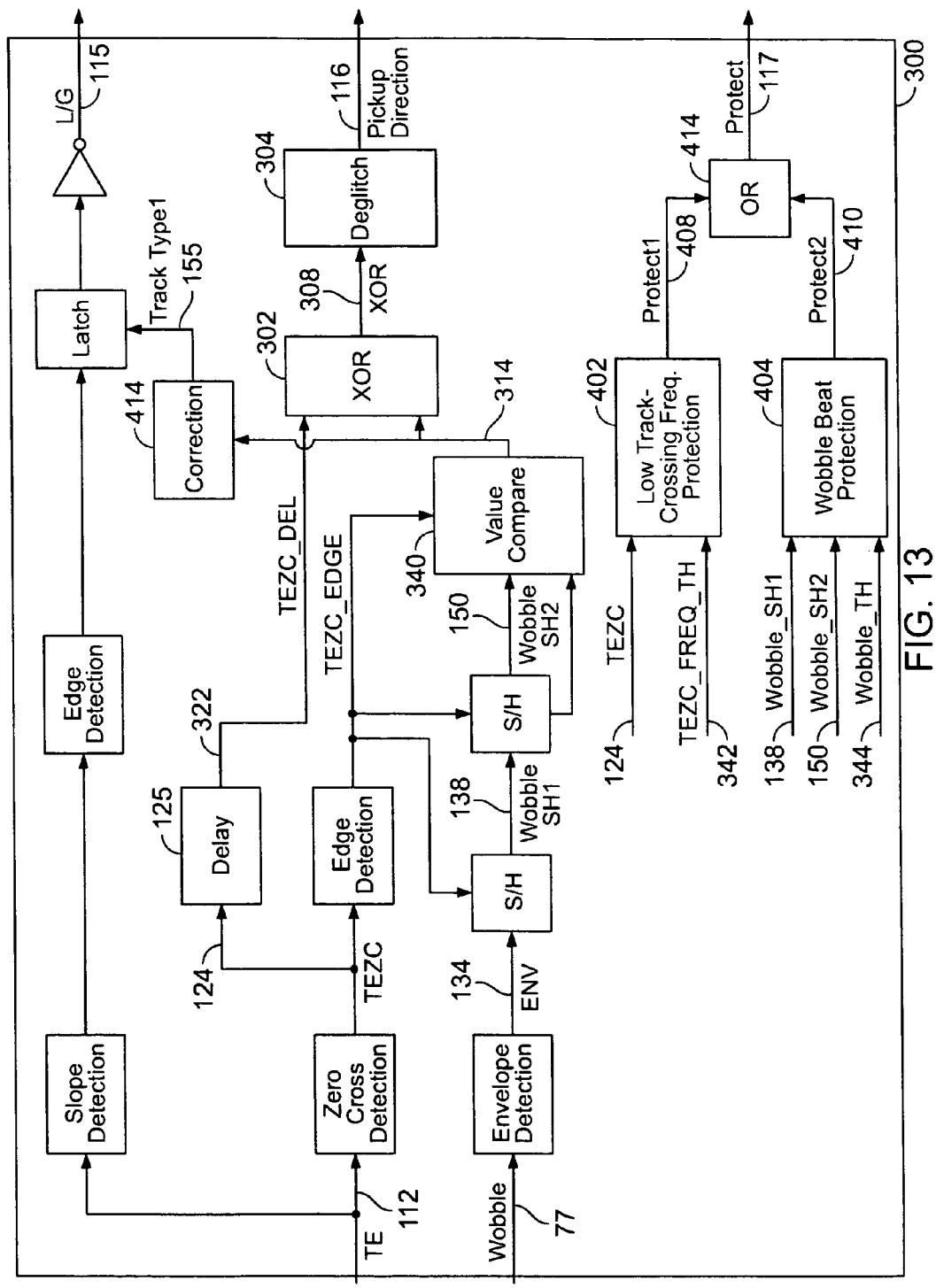
FIG. 13 shows a land/groove track and pickup head movement direction detection device.
Figure 14:
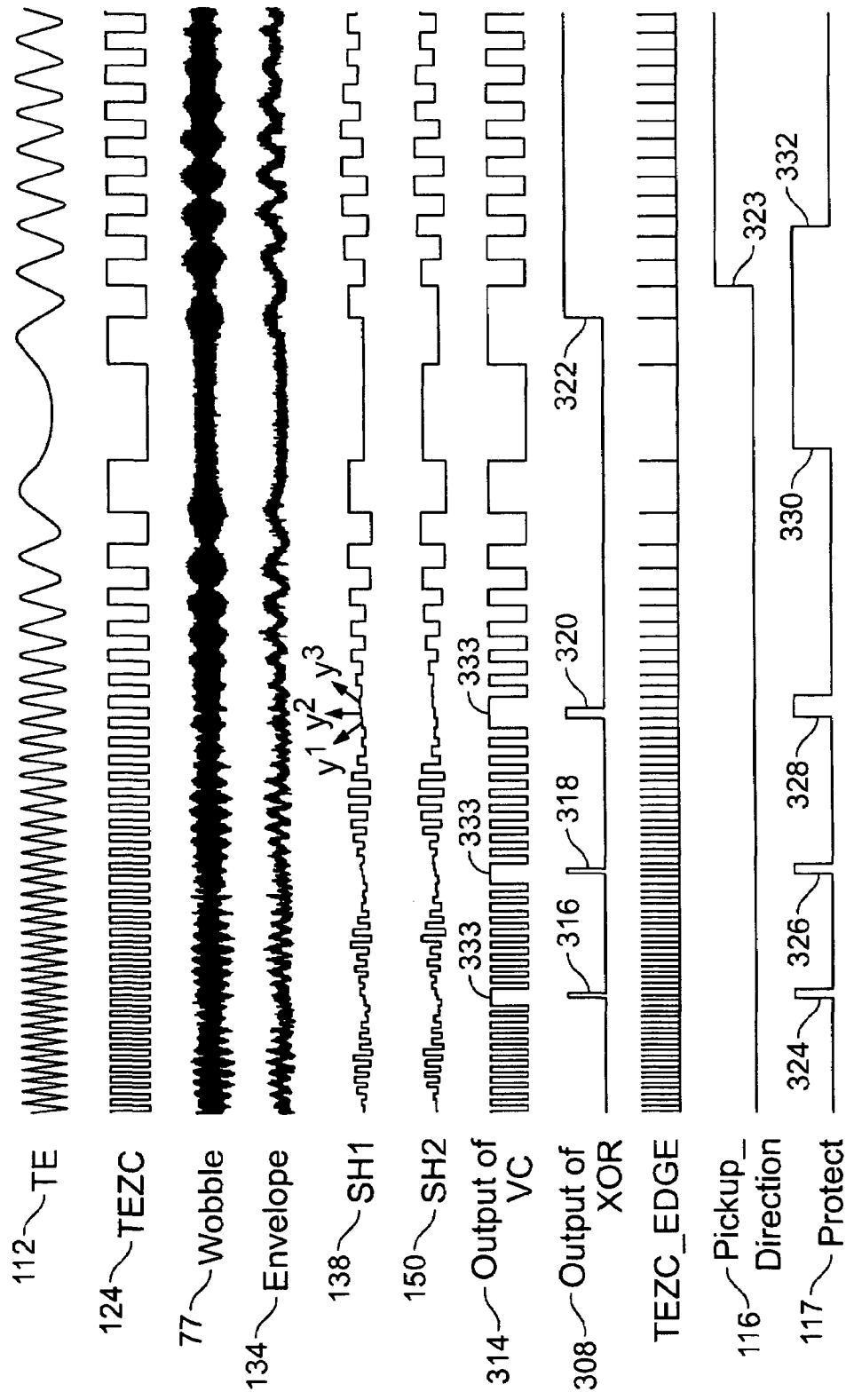
FIG. 14 shows graphs of signals generated by the device of FIG. 13.

Due to the wobble beat, the difference in wobble amplitude between adjacent land and groove tracks can become so small such that it may be difficult to determine the land/groove track type and pickup head movement direction using the comparator 142 (FIG. 10 or 12), resulting in error in accessing specified tracks. The following describes a method to overcome this problem Third Method of Generating L/G Signal and Pickup Direction Signal FIG. 13 shows an example of a land/groove track and pickup head movement direction detection device 300. FIG. 14 shows graphs 310 of signals generated by the units of the device 300.

The device 300 is similar to the device 120 of FIG. 9, but instead of using a latch 144 as in device 120, the device 300 uses an XOR gate 302. As can be seen in FIG. 14, the output 314 of the value compare unit 340 and the TEZC signal 124 change in the same direction (e.g., both becomes high or low) when the pickup head 20 is moving radially inwards, and changes in the opposite direction (e.g., the TEZC 124 becomes high whereas the output 314 becomes low) when the pickup head 20 is moving radially outwards. Thus, a pickup head radial movement direction signal can be obtained by performing an XOR operation on the output 314 and the TEZC signal 124. Because the output 314 of the value compare unit 340 slightly lags the TEZC signal 124, the TEZC signal 124 is delayed by a delay unit 125 for the same amount of time prior to being sent to the XOR gate 302.

Wobble beats can be observed from the sample signal SH1 138, which shows that the differences between adjacent tracks alternately increase and decrease. When the wobble amplitude between adjacent tracks are small, such as at tracks y1, y2, and y3 (see FIG. 14), it may be difficult to accurately determine the land/groove track type and the pickup head radial movement direction based on comparisons of wobble amplitudes at successive tracks. The wobble amplitude at track y2 is larger than at track y1, and the wobble amplitude at track y3 is larger than at track y2. If the device 120 (FIG. 9) or 200 (FIG. 11) were used, it may incorrectly determine that the tracks y1, y2, and y3 were all groove tracks, and that the pickup head 20 changed abruptly from moving inwards to outwards then to inwards at tracks y1 y2, and y3. Such errors are referred to as glitches.

A deglitch unit 304 is used to remove the glitches (e.g., 316, 318, 320) from the output of the XOR gate 302 to generate a pickup head movement direction signal 116. In one example, the deglitch unit 304 counts the number of half-cycles that passes after a change in the XOR signal 308. If the number of half-cycles is less than or equal to a preset value m (in FIG. 14, m is set to be equal to 1), the pickup head movement direction signal 116 will remain unchanged. For example, the pulses 316, 318, and 320 turn low after one half-cycle, so the pickup direction signal 116 remains unchanged at pulses 316, 318, and 320. If the number of half-cycles is greater than the preset value m, the pickup head movement direction signal 116 will change. For example, after the XOR signal 308 pulled high at 322, the XOR signal 308 remains high for more than one half-cycle, thus the pickup direction signal 116 changes to high (e.g., 323) after one half-cycle.

In general, the deglitch unit 304 prevents the track accessing unit 110 from incorrectly holding the TE value when the pickup head 20 is at a groove track. However, when the pickup head 20 changes its movement direction, such a change will not be reflected in the pickup direction signal 116 until after m half-cycles of the TE signal 112. The track accessing unit 110 may incorrectly rely on the pickup direction signal 306 during this delay period, causing instability in track accessing.

When the pickup head 20 reverses its radial movement direction, the frequency of track crossings (the frequency in which the pickup head 20 crosses the tracks) often falls below a certain threshold value. Thus, to reduce errors due to the delays caused by the deglitch unit 304, the device 300 includes a low track-crossing frequency protection unit 402 that compares the frequency of the TEZC signal 124 (which represents the frequency of track crossings) with a TEZC frequency threshold (TEZC_FREQ_TH) 342, and generates a PROTECT 1 signal 408. The PROTECT 1 signal 408 is pulled high when the frequency of the TEZC signal 112 is lower than TEZC_FREQ_TH 342, and pulled low when the frequency of the TEZC signal 112 is equal to or higher than TEZC_FREQ_TH 342.

In one example, TEZC_FREQ_TH=1 kHz. The PROTECT 1 signal 402 is pulled high (e.g., 330 in FIG. 14) when the frequency of the TEZC signal 112 is less than 1 kHz, and is pulled low (e.g., 332) a number of half-cycles after the frequency of the TEZC signal 112 is equal to or greater than 1 kHz.

When the PROTECT 1 signal 408 is pulled high, it indicates that the track accessing unit 110 should not use the land/groove signal 115 and the pickup direction signal 116 to determine whether to perform certain actions in track accessing, such as holding the TE signal 112 (using the TE hold mechanism 312), applying a braking force to the pickup head 20 when attempting to lock the pickup head 20 to a track, and locking the pickup head 20 to a particular track.

The device 300 includes a wobble beat protection unit 404 to reduce errors due to wobble beat. The protection unit 404 receives the sampled value (Wobble_SH1) 138, the delayed sampled value (Wobble_SH2) 150, a wobble threshold value (Wobble_TH) 344, and generates a PROTECT 2 signal 410. The PROTECT 2 signal 410 is pulled high when the difference between two successive samples of the wobble envelope is smaller than the wobble threshold 344, and pulled low when the difference between two successive samples of the wobble envelope is equal to or greater than the wobble threshold 344. This prevents the track accessing unit 110 from incorrectly controlling the pickup head movement when there are glitches, such as those represented by pulses 316, 318, and 320 (FIG. 14).

The PROTECT 1 and PROTECT 2 signals are sent to an OR gate 414 to generate the protection signal 117 that is sent to the track accessing unit 110 (FIG. 8).

In the example of FIG. 13, the protection signal 117 is pulled high when either the frequency of the TEZC signal 112 is less than TEZC_FREQ_TH 342, or when |SH1−SH2|<Wobble_TH 344. The protection signal 117 is pulled low when |SH1−SH2|≧Wobble_TH 344 and the frequency of the TEZC signal 112 is equal to or greater than TEZC_FREQ_TH 342.

Figure 15:
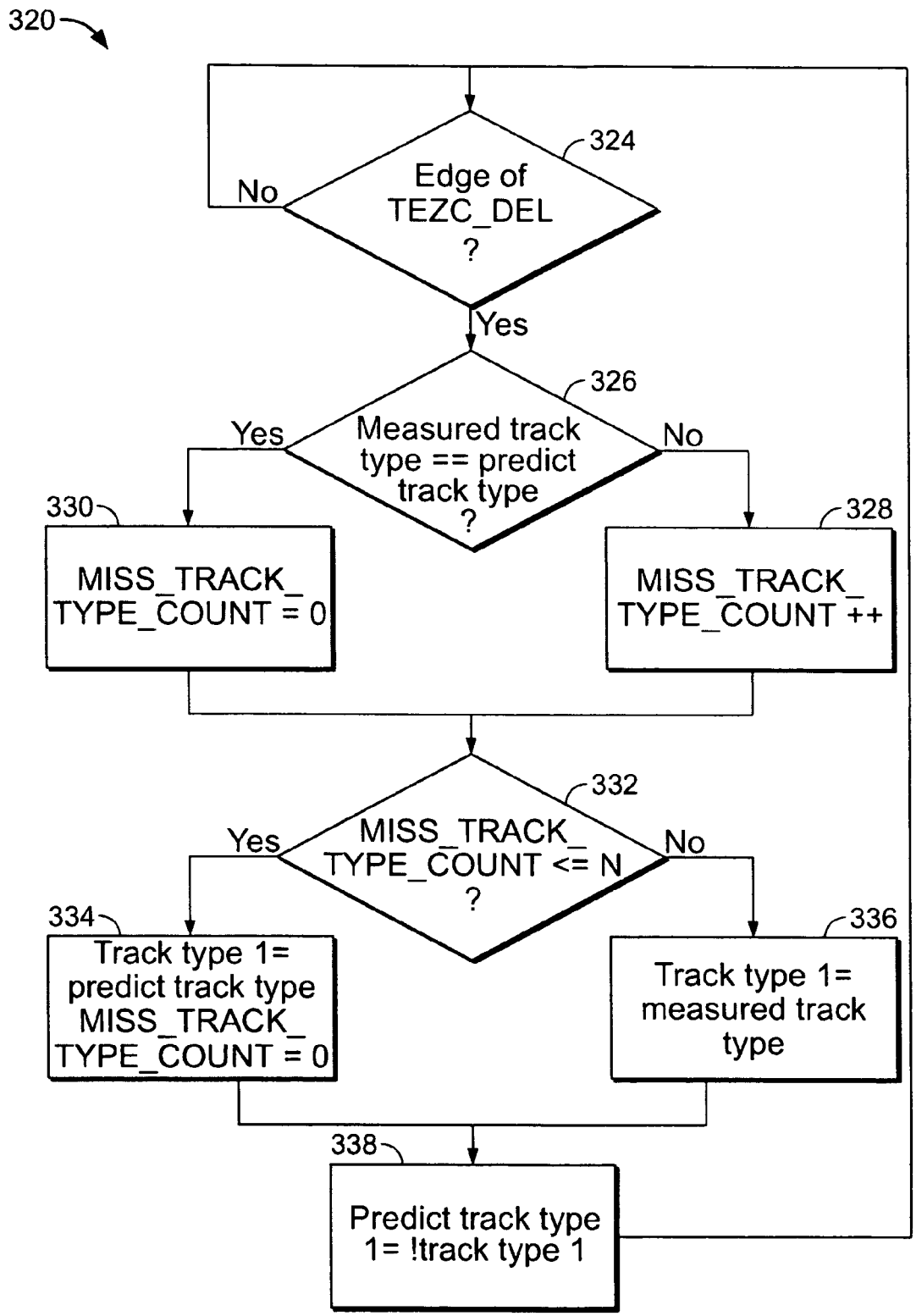
FIG. 15 shows a process.

FIG. 15 shows a process 320 implemented by a correction unit 414 (FIG. 13) for correcting the output 314 of the value compare unit 142 to generate a corrected first track type signal 155. The process 320 uses information about a track whose track type is known to predict the track type of the next track. For example, if the current track is known to be a groove track, then the next track is predicted to be a land track, and the track after the next is predicted to be a groove track. In the process 320, the edge of the delayed TEZC signal 322 is determined 324, then the measured track type is compared 326 with the predicted track type. If the measured track type is different from the predicted track type, a variable miss_track_type_count is increased 328 by one. The variable miss_track_type_count represents a count value of the number of tracks that the measured track type is different from the predicted track type. If the measured track type is the same as the predicted track type, miss_track_type_count is assigned to be zero.

The variable miss_track_type_count is compared 332 with a preset value N (e.g., 3). If miss_track_type_count is less than or equal to the preset value N, meaning that it is possible that the disagreement between the predicted track type and the measured track type is due to a glitch, the first track type signal 155 is set 334 to a value that represents the predicted track type, and the miss_track_type_count is set 334 to zero. If miss_track_type_count is greater than the preset value N, meaning that it is likely that the difference is not due to a glitch, the first track type signal 155 is set 336 to a value that represents the measured track type. The predicted track type is set 338 to be the opposite of the current first track type (because the next track should have a track type that is opposite from the current track), and the process 320 loops back to determining 324 the edge of the delayed TEZC signal 322.

An XOR operation can be performed on the corrected first track type signal 155 and the delayed TEZC signal 322 to obtain a pickup movement direction signal 116 that does not have glitches. Similarly, an XOR operation can be performed on the deglitched pickup movement direction signal 116 to obtain the corrected first track type signal 155.

In the device 300 of FIG. 13, the land/groove signal 115 can be derived from the corrected first track type signal 155 and the TE signal 122 using methods previously described.

Discs Having Blank Tracks and Data Tracks

When an optical disc has data recorded in the tracks, the wobble signal will be affected by the recorded data. The following describes an optical recording system that determines the land/groove track type and pickup head movement direction taking into account of whether data are recorded in the tracks.

Figure 16:
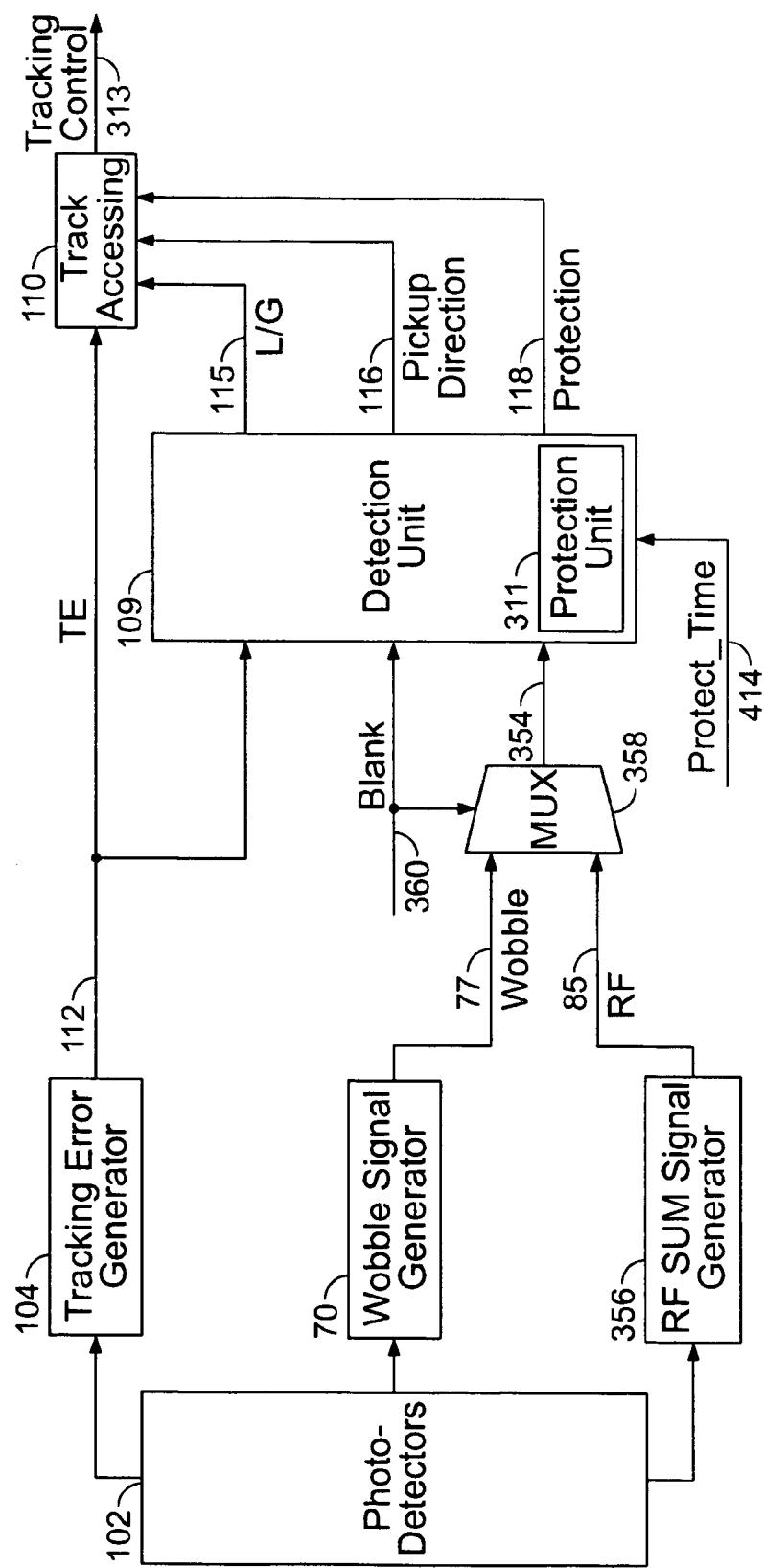
FIG. 16 shows a block diagram of modules for generating a tracking control signal for controlling the pickup head when accessing tracks.

FIG. 16 shows a block diagram of modules for generating a tracking control signal 313 for controlling the pickup head 20 when accessing tracks. The modules in FIG. 16 are similar to those in FIG. 8, with the addition of an RF signal generator 356 and a multiplexer 358. The multiplexer 358 allows the system 10 to select the wobble signal 77 or the RF signal 85 for use in track accessing. In one example, the multiplexer 358 is controlled by a blank signal 360, which is 0 or 1 depending on whether the pickup head 20 is at a portion of the disc 12 that is blank (referred to as a blank area) or at a portion of the disc 12 having data (referred to as a data area), respectively. Alternatively, the multiplexer 358 can be controlled by a user-selectable signal that allows a user to manually select the wobble signal 77 or the RF signal 85 for use in track accessing, depending on the type or condition of the disc 12. The output 354 of the multiplexer 358 is sent to a detection unit 109, which can have components similar to, for example, those of the device 120 (FIG. 9), 200 (FIG. 11), or 300 (FIG. 13).

Figure 17:
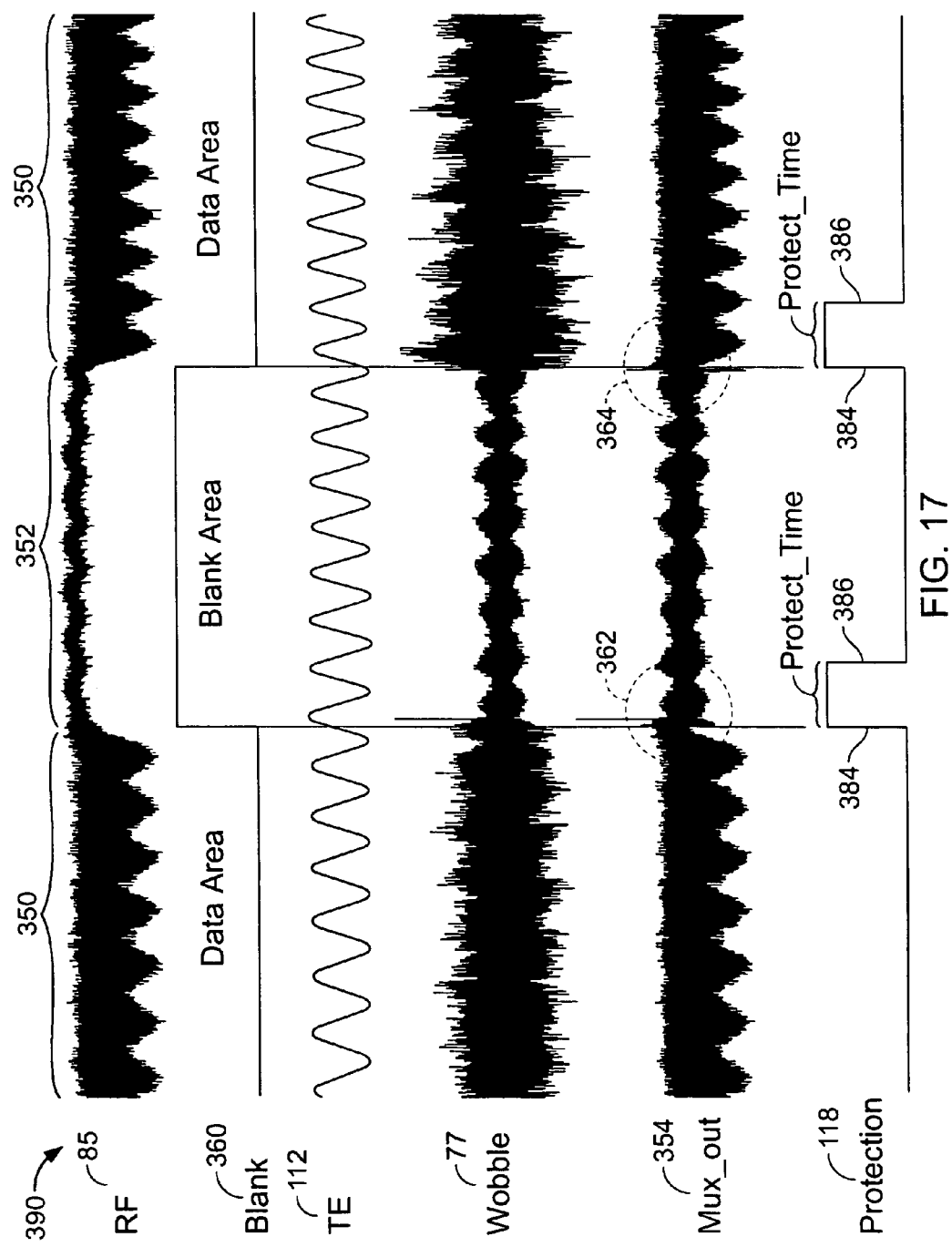
FIG. 17 shows graphs of signals measured from a disc having data areas and blank areas.

FIG. 17 shows graphs 390 of signals measured from a disc having data areas 350 and blank areas 352. In one example, for discs having data areas 350 and blank areas 352, the land/groove track type and the pickup head radial movement direction can be determined by using the RF signal 85 at the data area 350, and using the wobble signal 77 at the blank area 352. As shown in FIG. 21, the differences in amplitudes of the RF signal 85 between adjacent groove and land tracks are greater in the data area 350, and smaller in the blank area 352. The differences in amplitudes of the wobble signal 77 between adjacent groove and land tracks are smaller in the data area 350, and greater in the blank area 352.

When the wobble signal 77 is selected by the multiplexer 358, the land/groove signal 115 and the pickup movement direction signal 116 can be generated as described previously. When the RF signal 85 is selected by the multiplexer 358, the land/groove signal 115 and the pickup movement direction signal 116 can be generated as described previously, or by comparing the phases of the zero crossings of the envelope of the RF signal 85 and the TEZC signal 124.

When the multiplexer 358 switches from the RF signal 85 to the wobble signal 77, and vice versa, there may be discontinuities (e.g., 362 and 364) in the signal level of the output 354 of the multiplexer 358. This may result in errors in the land/groove signal 115 and the pickup direction signal 116, causing the TE hold mechanism 312 to incorrectly hold the TE signal 112.

The detection unit 356 includes a protection unit 311 that generates a protection signal 118 to indicate that there may be errors in the land/groove signal 115 and the pickup direction signal 116 during a period that the multiplexer 358 switches between the RF signal 85 and the wobble signal 77. The protection unit 311 raises (e.g., 384) the protection signal 118 to high when the multiplexer 358 switches signals, and lower (e.g., 386) the protection signal 118 to low after a preset protection period (Protect_time). In one example, the protection period is equal to one cycle of the TEZC signal 124. During this period, because the protection signal 118 is high, the TE hold module 312 does not hold the TE signal 112.

Figure 18:
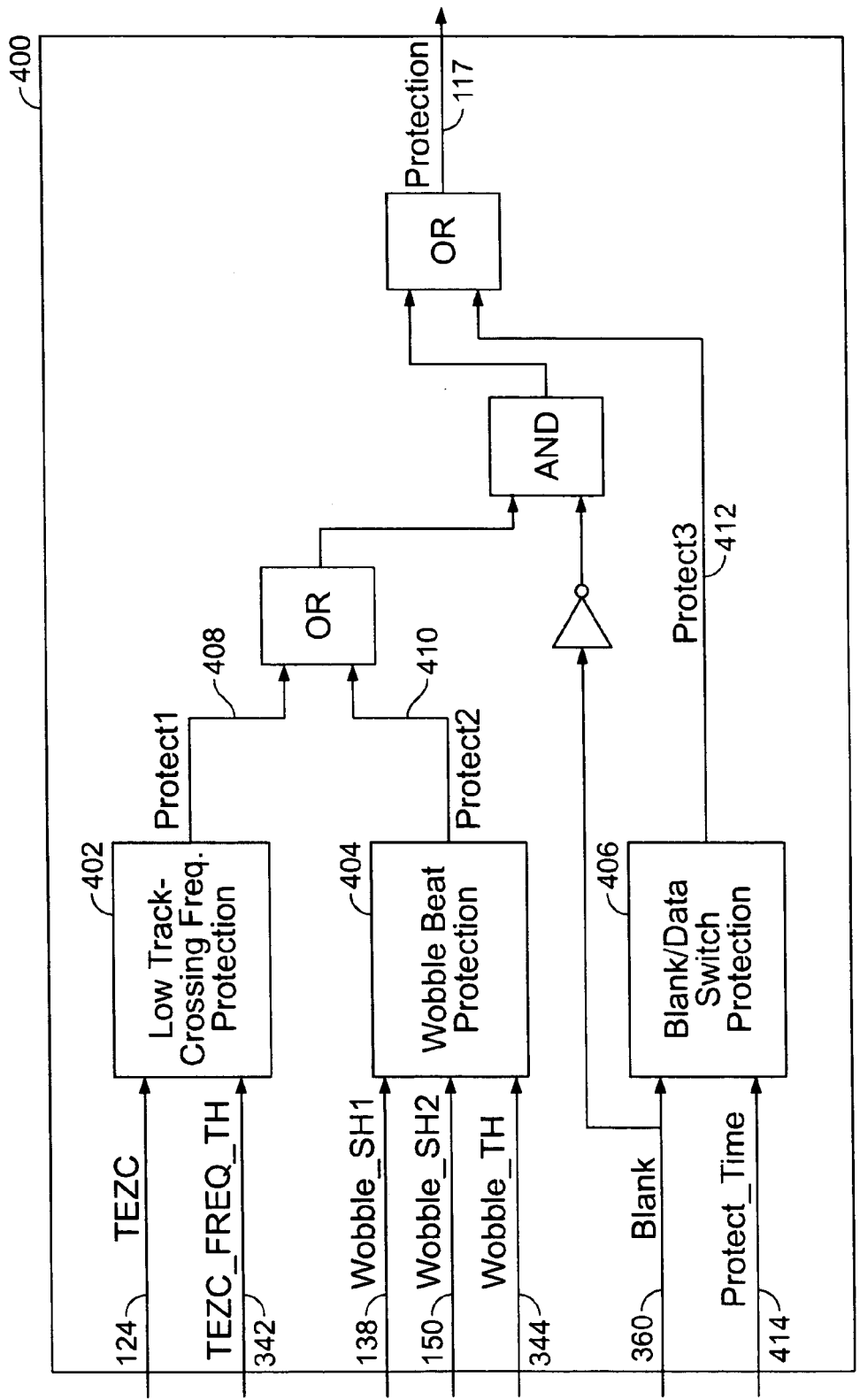
FIG. 18 shows a schematic diagram of a protection unit.

FIG. 18 shows a schematic diagram of a protection unit 400 that includes the functionality of the protection units 310 and 311. The protection unit 400 includes a low track-crossing frequency protection unit 402, a wobble beat protection unit 404, and a blank/data switch protection unit 406. The low track-crossing frequency protection unit 406 generates a PROTECT 1 signal 408 that is pulled high when the frequency of the TEZC signal 124 is lower than TEZC_FREQ_TH 342. The PROTECT 1 signal 408 is pulled low when the frequency of the TEZC signal 124 is equal to or greater than TEZC_FREQ_TH 342. The wobble beat protection unit 404 generates a PROTECT 2 signal 410 that is pulled high when |SH1−SH2|<Wobble_TH 344 and pulled low when |SH1−SH2|≧Wobble_TH 344. The blank/data switch protection unit 406 generates a PROTECT 3 signal 412 that is pulled high when the multiplexer 358 switches between the RF signal 85 and the wobble signal 77, and is pulled low after a period of time indicated by Protect_time 414.

The protection unit 400 includes logic gates to process the signals PROTECT 1, PROTECT 2, and PROTECT 3 to generate a protection signal 117. The protection signal 117 is high when (1) the PROTECT 3 signal 412 is high, or (2) when the blank signal 360 is low and either the PROTECT 1 signal 408 or the PROTECT 2 signal 410 is high.

Although some examples have been discussed above, other implementations and applications are also within the scope of the following claims. For example, the land tracks may be designed so that the borders of a land track are parallel to each other, while the borders of a groove track may not be parallel to each other. In this case, the amplitude of a push-pull signal sampled at a land track may be larger than that of a groove track.

The slope of the tracking error signal measured over time depends on whether the land tracks have higher reflectances than the groove tracks, and on the algorithm used to calculate the tracking error signal. For example, in FIG. 7, if the land tracks are designed to have reflectances that are lower than the groove tracks, the tracking error signal will have a higher value when the pickup head 20 is at a position (e.g., $P_{30}$) in which photosensors 60 and 63 detect light reflected from a groove track and photosensors 61 and 62 detect light reflected from a land track. The tracking error signal will have a lower value when the pickup head 20 is at a position (e.g., $P_{32}$) in which photosensors 60 and 63 detect light reflected from a land track and photosensor 61 and 62 detect light reflected from a groove track. In this situation, the slope of the tracking error signal will be positive or negative when the pickup head is at a groove track or a land track, respectively, as the pickup head moves radially outwards. Conversely, when the pickup head 20 is moving inwards relative to the tracks, the slope of the tracking error signal 112 will be negative when the pickup head 20 is at a groove track, and be positive when at a land track.

In FIG. 7, whether the slope of the tracking error signal 112 is positive or negative when the pickup head 20 is at a groove track when the pickup head moves in an outward direction depends on the configuration of the photo detector 40 and the algorithm for calculating the tracking error signal.

In FIG. 6, the photo detector 40 can be a bisection photodetector that has two independent photo detectors to detect light reflected from left and right portions of a track.

The land/groove track type and the pickup head radial movement direction can be determined based on a comparison of the wobble signal measured at different times. The optical recording system 10 can also have more than one photodetector 40 that generates wobble signals based on measurements of adjacent tracks. The wobble signals that are simultaneously generated by different photodetectors 40 can be compared to determine the land/groove track type and the pickup head radial movement direction.

The description for controlling tracking actuators for fine-adjustment of the position of the lens in the pickup head have been omitted. In one example, locking the pickup head to a particular track involves controlling a combination of the sled motor and the tracking actuator to adjust the positions of the pickup head and the lens to lock the laser beam on the particular track. The signals in the above description (e.g., the tracking error signal, the wobble signal, the RF signal) can be based on the position of the laser beam relative to the tracks.

The high and low signal levels can be interchanged. For example, the pickup movement direction signal 116 can be configured so that when the signal 116 is high, it indicates that the pickup head 20 is moving from an outer track to an inner track, and when the signal 116 is low, it indicates that the pickup head 20 is moving from an inner track to an outer track The disc 12 can be any type of disc in which the tracks have recurring deviations, such as CD-R, CD-RW, DVD+R, DVD+RW, DVD-R, DVD-RW, Blu-ray Recordable (BD-R), Blu-ray Rewritable (BD-RW), High-Density DVD (HD- DVD), double-layer discs, or multiple layer discs. Comparing different samples of a wobble signal to determine the track type and the pickup head movement direction is not limited to an optical storage system. It can also be used in other systems, such as magneto-optic or magnetic recording systems. The optical disc can be configured to record data by modifying transmissivities of portions of the disc.

The optical recording system 10 may include a decoder that decodes encoded data according to a process that is compatible with at least one of CD-R, DVD+R, DVD-R, DVD+RW, DVD-RW, Blu-ray Disc, and High-Density DVD standard. The optical recording system 10 may be configured to access double-layer or multiple layer discs.

The land/groove track and pickup head movement direction detection devices 120 (FIG. 9), 200 (FIG. 11), 300 (FIG. 13), and 109 (FIG. 16) can have units similar to the deglitch unit 304 (FIG. 13) and the correction unit 414 for removing glitches. The devices 120, 200, 300, and 109 can also have a unit similar to the protection unit 400 to prevent errors when the frequency of track crossings is low, when wobble beat occurs, or when switching between a blank portion and a data portion.

What is claimed is:

1. A method comprising:
   receiving an optical storage medium having groove tracks and land tracks, each track having a wobble structure;
   scanning a detector across the optical storage medium to detect light reflected from the optical storage medium;
   generating a wobble signal and a tracking error signal based on outputs of the detector;
   sampling the wobble signal according to the tracking error signal; and
   determining whether the detector is at the groove track or the land track based on the tracking error signal and a comparison of sampled values of the wobble signal.

2. The method of claim 1, comprising determining that the detector is at a groove track at a particular time when the sampled value that is obtained at the particular time is greater than another sampled value obtained at another time.

3. The method of claim 1, comprising sampling the wobble signal when the tracking error signal is zero.

4. The method of claim 1, comprising comparing sampled integral values of an envelope of the wobble signal integrated over different periods of time in the determination of whether the scanning is at a land track or a groove track.

5. The method of claim 4, in which the integrals are computed by integrating the amplitude of the envelope of the wobble signal during a time interval in which a slope of the tracking error signal is positive or during a time interval in which the slope of the tracking error signal is negative.

6. The method of claim 1, comprising, based on knowledge of whether a first track is a groove track or a land track, predicting whether a second track is a groove track or a land track.

7. The method of claim 6, comprising comparing the predicted track type of the second track with a measured track type of the second track, the measured track type being determined based in part on the wobble signal.

8. The method of claim 7, comprising performing comparisons of predicted track types and measured track types for a number of tracks, and determining that the last predicted track type is the correct track type as long as the number of comparisons indicating that the predicted track types are different from the measured track types is smaller than a preset value.

9. The method of claim 7, further comprising performing comparisons of predicted track types and measured track types for a number of tracks, and determining that the measured track type is the correct track type if the number of comparisons indicating that the predicted track types are different from the measured track types is greater than a preset value.

10. The method of claim 1 comprising sampling at least one of an amplitude of the wobble signal, a peak value of the wobble signal, and an envelope of the wobble signal.

11. A method comprising:
    scanning a beam across an optical storage medium having land tracks and groove tracks, each track having a wobble structure;
    generating a wobble signal and an RF signal based on light reflected from the optical storage medium, the wobble signal having information about the wobble structure of a track scanned by the beam, the RF signal having information about data recorded in the track;
    selecting one of the wobble signal and the RF signal; and
    determining whether the beam is at a groove track or a land track based on a comparison of sampled values of the selected signal.

12. The method of claim 11 in which selecting one of the wobble signal and the RF signal comprises selecting based on whether the beam is at a data region of the optical storage medium having data or at a blank region of the optical storage medium having no data.

13. The method of claim 11, further comprising generating a tracking error signal having an amplitude that varies depending on a position of the detector relative to the groove tracks and the land tracks, in which determining whether the beam is at a groove track or a land track comprises comparing sampled values of the selected signal that are sampled according to the tracking error signal.

14. A method comprising:
    determining whether scanning is occurring at a groove track or a land track on a recording medium based on a comparison of sampled values of a wobble signal that is derived by scanning recurring deviations of a physical property of the groove track or the land track.

15. The method of claim 14, in which the recording medium comprises an optical recording medium, and the scanning comprises scanning a light beam across the optical recording medium.

16. The method of claim 14, in which the recurring deviations comprise deviations of a boundary of the track in a direction transverse to the track.

17. The method of claim 14, in which the sampled values are obtained when the scanning occurs at a center of either a land track or a groove track.

18. The method of claim 14, in which the determination of whether the scanning is occurring at one of the groove track or land track is also based on a slope of a signal that changes slope depending on whether the scanning is moving from a land track to a groove track or from a groove track to a land track.

19. The method of claim 14 in which sampled values of the wobble signal comprise values of an envelope of the wobble signal integrated over time.

20. The method of claim 14 in which determining whether scanning is occurring at a groove track or a land track based on a comparison of sampled values of a wobble signal comprises:
    determining whether scanning is occurring at a groove track or a land track based on a comparison of a first sampled value of a wobble signal at a current track and a second sampled value of the wobble signal at an adjacent track.

21. The method of claim 20 in which determining whether scanning is occurring at a groove track or a land track based on a comparison of sampled values of a wobble signal comprises:
determining that the scanning is occurring at the groove track when the amplitude of the first sampled value of the wobble signal at the current track is larger than the amplitude of the second sampled value of the wobble signal at the adjacent track.

22. An apparatus comprising:
a pickup head to scan an optical storage medium having groove tracks and land tracks, and detect recurring deviations in a physical property of the tracks;
a wobble signal generator to generate a wobble signal that represents the recurring deviations and having an amplitude that varies depending on a position of the pickup head relative to the groove track or the land track;
a tracking error signal generator to generate a tracking error signal, the tracking error signal and the wobble signal being based on outputs of the pickup head; and
a land/groove track signal generator to generate a land/groove signal indicating whether the pickup head is scanning a groove track or a land track based on the tracking error signal and a comparison of sampled values of the wobble signal.

23. The apparatus of claim 22 in which the land/groove track signal generator comprises a comparator for comparing a current sampled value of the wobble signal with a latched sampled value of the wobble signal that is delayed with respect to the current sampled value to generate a comparison signal.

24. The apparatus of claim 23 in which the land/groove track signal generator comprises a land/groove signal generator for latching the comparison signal in response to changes in a slope of the tracking error signal and outputting the latched comparison signal as the land/groove signal.

25. The apparatus of claim 22 in which the land/groove signal generator comprises an integrator for integrating an envelope of the wobble signal during a time interval in which a slope of the tracking error signal is positive or during a time interval in which the slope of the tracking error signal is negative, and the land/groove signal generator generates the land/groove signal based on a comparison of a current output of the integrator with a latched output of the integrator that is delayed with respect to the current output.

26. An apparatus comprising:
a comparator to compare sampled values of a wobble signal that is derived by scanning recurring deviations of a physical property of a groove track or a land track on a recording medium; and
a circuit to generate an output indicating whether scanning is occurring at the groove track or the land track based on an output of the comparator.

27. The apparatus of claim 26, further comprising an optical pickup head that scans a light beam across the recording medium and detects light reflected from or transmitted through the recording medium to detect the recurring deviations.

28. The apparatus of claim 26 in which the comparator compares a first sampled value of a wobble signal at a current track and a second sampled value of the wobble signal at an adjacent track.

29. The apparatus of claim 28 in which the circuit determines that the scanning is occurring at the groove track when the amplitude of the first sampled value of the wobble signal at the current track is larger than the amplitude of the second sampled value of the wobble signal at the adjacent track.

30. An apparatus comprising:
a multiplexer to select one of a wobble signal and an RF signal, the wobble signal having information about a difference between two signals derived by scanning a groove track or a land track on a recording medium, each track having a physical property having recurring deviations, the RF signal having information about data recorded in the tracks; and
a circuit to generate an output indicating whether scanning is occurring at the groove track or the land track based on a comparison of sampled values of the selected signal.

31. The apparatus of claim 30 in which the multiplexer receives a selection signal indicating whether the scanning occurs at a data region of a track having data or a blank region of a track not having data.

32. An apparatus comprising:
a comparator to compare sampled values of a wobble signal that is derived by scanning recurring deviations of a physical property of a groove track or a land track on a recording medium; and
a circuit to generate an output indicating a movement direction of a pickup head relative to the land track and the groove track based on an output of the comparator.

33. A method comprising:
scanning a beam across an optical storage medium having land tracks and groove tracks, each track having a wobble structure;
generating a wobble signal and an RF signal based on light reflected from the optical storage medium, the wobble signal having information about the wobble structure of a track scanned by the beam, the RF signal having information about data recorded in the track;
when in a first situation, determining whether the beam is at a groove track or a land track based on the wobble signal; and
when in a second situation, determining whether the beam is at a groove track or a land track based on the RF signal.

34. The method of claim 33 in which determining whether the beam is at a groove track or a land track based on the wobble signal when in the first situation comprises determining whether the beam is at a groove track or a land track based on the wobble signal when the beam is at a blank area.

35. The method of claim 33 in which determining whether the beam is at a groove track or a land track based on the RF signal when in the second situation comprises determining whether the beam is at a groove track or a land track based on the RF signal when the beam is at a data area.

36. The method of claim 33 in which selecting the wobble signal in the first situation and selecting the RF signal in the second situation comprises controlling a multiplexer to select the wobble signal in the first situation and controlling the multiplexer to select the RF signal in the second situation.

* * * * *